United States Patent
Shimada et al.

(10) Patent No.: US 7,269,807 B2
(45) Date of Patent: Sep. 11, 2007

(54) AREA RATIO/OCCUPANCY RATIO VERIFICATION METHOD AND PATTERN GENERATION METHOD

(75) Inventors: Junichi Shimada, Osaka (JP); Fumihiro Kimura, Nara (JP); Mitsumi Ito, Kyoto (JP); Kiyohito Mukai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 10/886,704

(22) Filed: Jul. 9, 2004

(65) Prior Publication Data

US 2005/0172248 A1   Aug. 4, 2005

(30) Foreign Application Priority Data

Feb. 4, 2004   (JP) ............................. 2004-027868

(51) Int. Cl.
  *G06F 17/50* (2006.01)
(52) U.S. Cl. .................... 716/5; 716/4; 716/6
(58) Field of Classification Search .............. 716/4–6
  See application file for complete search history.

(56) References Cited

U.S. PATENT DOCUMENTS

| | | | | |
|---|---|---|---|---|
| 5,144,142 A | * | 9/1992 | Fueki et al. ............ 250/396 R |
| 5,636,133 A | * | 6/1997 | Chesebro et al. ............... 716/4 |
| 5,923,563 A | * | 7/1999 | Lavin et al. ................... 716/19 |
| 6,182,272 B1 | * | 1/2001 | Andreev et al. .............. 716/13 |
| 6,236,746 B1 | * | 5/2001 | Chamberlain et al. ....... 382/145 |
| 6,253,362 B1 | * | 6/2001 | Anand et al. .................. 716/8 |
| 6,260,179 B1 | * | 7/2001 | Ohsawa et al. ................ 716/5 |
| 6,305,000 B1 | * | 10/2001 | Phan et al. ..................... 716/5 |
| 6,567,964 B2 | | 5/2003 | Shin et al. |
| 6,642,598 B2 | * | 11/2003 | Ikeda .......................... 257/499 |
| 6,770,554 B1 | * | 8/2004 | Welstand .................... 438/618 |
| 7,062,732 B2 | * | 6/2006 | Ito et al. ........................ 716/5 |
| 2003/0229479 A1 | * | 12/2003 | Smith et al. .................. 703/14 |
| 2004/0058533 A1 | * | 3/2004 | Sakai et al. ................. 438/689 |
| 2004/0060033 A1 | | 3/2004 | Kamon |
| 2004/0098674 A1 | * | 5/2004 | Vuong et al. .................. 716/1 |
| 2004/0133868 A1 | * | 7/2004 | Ichimiya ...................... 716/10 |
| 2004/0139412 A1 | * | 7/2004 | Ito et al. ........................ 716/8 |

FOREIGN PATENT DOCUMENTS

JP   2001-237323 A   8/2001
JP   2002-9161 A   1/2002

\* cited by examiner

*Primary Examiner*—Thuan Do
*Assistant Examiner*—Naum Levin
(74) *Attorney, Agent, or Firm*—McDermott Will & Emery LLP

(57) ABSTRACT

Verification of the pattern area ratio of a semiconductor integrated circuit device or the pattern occupancy ratio in a check window set for the semiconductor integrated circuit device is performed on an assumption that a dummy pattern defined by process conditions is placed in an unoccupied region of the semiconductor integrated circuit device or in an unoccupied region in at least one instance provided in the semiconductor integrated circuit device.

13 Claims, 21 Drawing Sheets

(Overlapped: 25 μm²)

FIG. 17
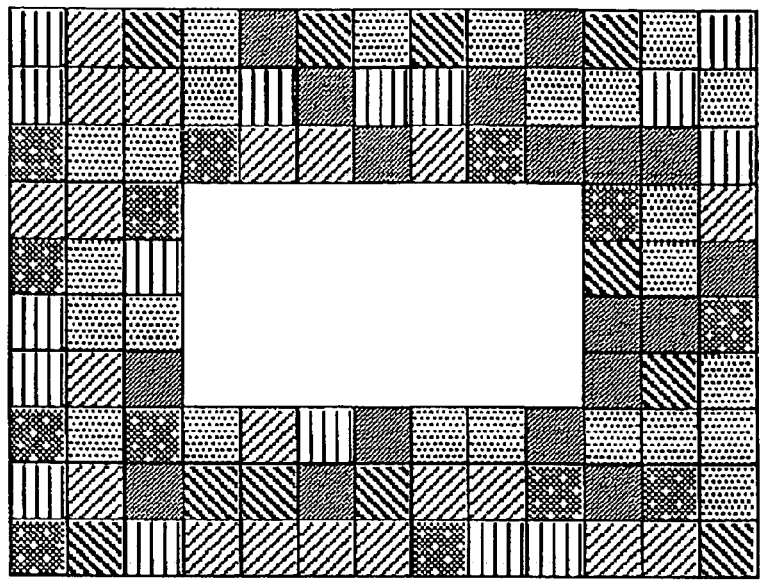
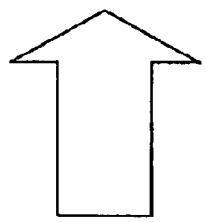
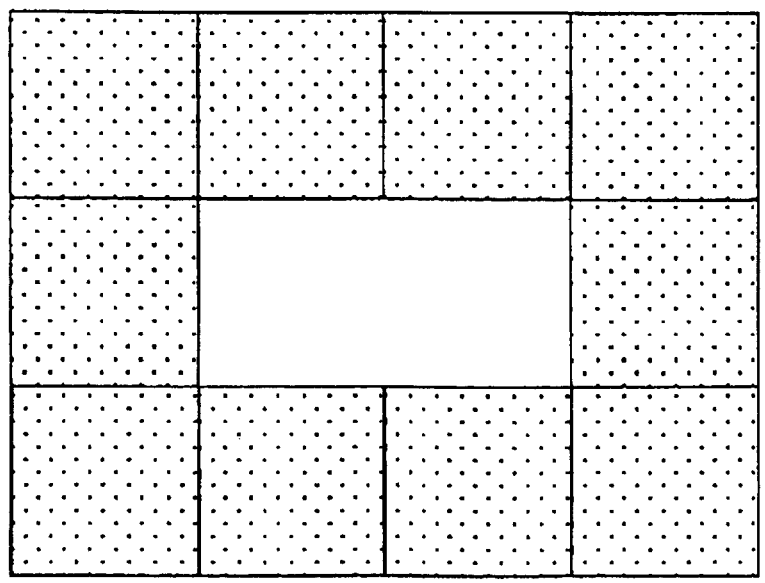
Block A

AREA RATIO/OCCUPANCY RATIO VERIFICATION METHOD AND PATTERN GENERATION METHOD

CROSS-REFERENCE TO RELATED APPLICATION

This application claims priority under 35 U.S.C. §119(a) on Japanese Patent Application No. 2004-027868 filed on Feb. 4, 2004, the entire contents of which are hereby incorporated by reference.

BACKGROUND OF THE INVENTION

The present invention relates to a verification method for generation of a semiconductor device pattern with which pattern formation and surface planarization are achieved with high precision according to the process conditions of a semiconductor device.

In recent years, semiconductor devices, especially large scale integration (LSI) semiconductor devices, have been key devices that are indispensable for electric machines. Accordingly, the degree of miniaturization and the degree of integration have been advancing, and the necessity for finer and more complicated pattern formation has been increasing. In such circumstances, restrictions to the process conditions that achieve pattern formation as designed have been increasing.

For example, in a wiring pattern formation process, after a conductive film, such as a polysilicon layer, an aluminum layer, a metal silicide layer, or the like, is formed, a desired mask pattern is formed by photolithography, and thereafter, etching is performed using the mask pattern, whereby the wiring pattern is formed.

In the etching process, part of the conductive film which is exposed through the mask pattern is selectively removed. At this step, even if the conditions of the etching process are optimized, the etching rate varies due to a variation in the density of the mask pattern (pattern area ratio) or the perimeter length of the mask pattern. Accordingly, the etching accuracy changes according to the pattern area ratio or the pattern pitch. As a result, the etching accuracy deteriorates when the mask pattern area is excessively large or excessively small.

Such problems may also occur in the formation of a diffusion layer. In the case where the ion implantation region is too small for the formation of the diffusion layer, concentration of ions occurs in the region so that a desired diffusion profile is not obtained.

CMP (Chemical Mechanical Polishing) method has been proposed for planarization of the substrate surface. In this method, mechanical polishing and chemical polishing are concomitantly performed on an insulating film which has been formed over a substrate surface by a coating method, a CVD (Chemical Vapor Deposition) method, or the like, whereby a flat substrate surface (the surface of the insulating film) is achieved. However, in the case where the pattern density of an underlying wiring layer formed of aluminum wirings, for example, is small, i.e., in the case where a region larger than a predetermined area includes no wiring pattern, the insulating film cannot have a flat surface even if the insulating film on the wiring layer is formed thicker. As a result, a concavity is formed in the region including no wiring pattern even when CMP is performed on the insulating film, and even in the following steps, the concavity still has the concave shape.

In such a case where the layout pattern of a certain layer in a semiconductor device is not uniform, sufficient pattern accuracy is not obtained in the layer, and in addition, the pattern accuracy is affected in the upper layers. As a result, the process accuracy is not sufficiently attained.

In order to solve the above problems, it is necessary to efficiently verify and adjust the area ratio in the certain layer which is obtained based on the process conditions (the pattern area ratio in each of a plurality of check windows (data windows) that cover the certain layer (hereinafter, referred to as "pattern occupancy ratio" for distinguishing from the pattern area ratio which indicates the area ratio over the entire chip area).

As a pattern placement method for achieving a desired value (target value) of the pattern area ratio or pattern occupancy ratio, a method for placing a dummy pattern in an unoccupied region of each check window (a region where none of various patterns, such as a wiring pattern, a device patter, etc., is formed) while changing the pitch and shape of the dummy pattern such that, for example, the pattern occupancy ratio satisfies a target value, has been proposed (for example, Japanese Unexamined Patent Publication No. 2002-9161).

Calculation method and pattern placement method for determining a dummy pattern to be placed in an unoccupied region have also been proposed. In these methods, the area of a device pattern, or the like, in a check window is calculated, and the shape of a dummy pattern to be placed in a remaining unoccupied region is determined based on the calculated area (for example, Japanese Unexamined Patent Publication No. 2001-237323).

However, in the above-described conventional methods, checking the pattern area ratio and/or the pattern occupancy ratio (hereinafter, "area ratio/occupancy ratio") in a chip where a pattern and a dummy pattern are placed by a CAD (computer-aided design) system, or the like, is a prerequisite. That is, in the case where the area ratio/occupancy ratio cannot reach the target value even when any of various dummy patterns generated under a certain condition is placed, generation of dummy patterns under different conditions and placement of the generated dummy patterns, and accordingly verification of the area ratio/occupancy ratio, must be executed a plurality of times no matter which conventional method is employed. Therefore, layout correction has to be made after loop processing of the dummy pattern generation, and accordingly, an enormous length of time is required. As a result, the design efficiency is extremely low.

In any of the above-described conventional methods, verification of the pattern occupancy ratio in the check window is executed thoroughly. Thus, the process time increases as the degree of integration increases along with the advancement of miniaturization or as the area of one check window decreases (i.e., the number of check windows increases). That is, verification of the pattern occupancy ratio is possible only when no black box exists in a check window, in other words, only when all of the patterns are placed within a check window. Thus, the process time cannot be reduced by hierarchal processing, or the like.

In conventional methods wherein the area ratio/occupancy ratio is verified thoroughly after generation of dummy patterns, if the area ratio/occupancy ratio does not attain the target value (if the area ratio/occupancy ratio has not yet reached the target value), the number of retrogressive manhours greatly increases, and accordingly, the design efficiency deteriorates significantly. In such conventional methods, dummy patterns are generated after the layout process is entirely completed. As a result, in some cases, the layout correction for attaining the target value of the area ratio/occupancy ratio is totally impossible.

SUMMARY OF THE INVENTION

The present invention was conceived in view of the above problems and circumstances. An objective of the present invention is to provide a quick and reliable area ratio/occupancy ratio verification method and a pattern generation method for generating a dummy pattern using such a verification method.

In the process of achieving the above objective, the present inventors reached a novel concept, i.e., a method for verifying the area ratio/occupancy ratio using a virtual dummy pattern without actually placing a dummy pattern on a computer with a CAD system, or the like, and a library creation method for enabling the area ratio/occupancy ratio verification through hierarchal processing.

Specifically, in an area ratio/occupancy ratio verification method of the present invention, the pattern area ratio of a chip or the pattern occupancy ratio in each check window is verified on an assumption that the most typical dummy pattern defined by process conditions (hereinafter, referred to as "default dummy pattern") is placed in an unoccupied region of a semiconductor integrated circuit device (chip) or an instance, thereby verifying whether or not the area ratio/occupancy ratio can attain the target value by generation of the dummy pattern.

In this specification of the present application, an instance means a semiconductor element of any type, such as a standard cell, an analog block, a memory, or the like. Virtual placement of a pattern means omitting placement of the pattern on a computer with a CAD system, or the like. In an area ratio/occupancy ratio verification method of the present invention, placement of a dummy pattern is not performed on a computer for checking the area ratio, or the like. Only the presence (shape, area, etc.) of a default dummy pattern, or the like, is considered in the calculation of the area ratio, or the like, without placing the dummy pattern. In the area ratio/occupancy ratio verification method of the present invention, the above-described repetitious (retrogressive) efforts are unnecessary, and accordingly, the time required for area ratio/occupancy ratio verification is greatly reduced as compared with the conventional techniques wherein an enormous length of time is required for placement (specifically, repetition of placement, verification, re-placement, reverification, . . . ) of a dummy pattern with a CAD system (for example, a Place & Routing tool (P&R tool)), or the like.

In the area ratio/occupancy ratio verification method of the present invention, if the target value of the area ratio/occupancy ratio cannot be attained by virtual placement of a default dummy pattern, generation specifications for the dummy pattern are preferably changed within a range that complies with a process rule such that the target value of the area ratio/occupancy ratio is attained, and a dummy pattern generated with the changed generation specifications is preferably virtually re-placed to perform reverification of the area ratio/occupancy ratio. If the target value of the area ratio/occupancy ratio has not attained by virtual placement of any dummy pattern, one of the step of outputting unattained position information to proceed to verification with a new check window and the step of discontinuing the verification process such that layout correction can be quickly performed is preferably selected.

In the area ratio/occupancy ratio verification method of the present invention which was conceived for achieving the above objective, the area ratio of the each instance in each layer of a semiconductor integrated circuit device is obtained as library information before verification of the pattern area ratio or pattern occupancy ratio, and the library information is used in the verification of the pattern area ratio or pattern occupancy ratio. With an assumption that the area ratio of each instance has a uniform value entirely inside the instance, hierarchal processing (processing for instance/processing for check window/processing for chip) can be realized by using the library information when calculating the area ratio/occupancy ratio in the verification of the area ratio/occupancy ratio. Thus, the verification process can be performed within a short interval of time. Further, the area ratio is obtained in each of a plurality of divisional regions of each instance for each layer and re-registered as library information. With such library information, the calculation process of the area ratio/occupancy ratio can be performed with high accuracy. Furthermore, the area ratio of a perimeter region which has a width equal to that of a check window in each instance for each layer is obtained as library information. With such library information, the calculation process of the area ratio/occupancy ratio can be performed quickly while maintaining the accuracy.

In the area ratio/occupancy ratio verification method of the present invention, verification of the area ratio/occupancy ratio can be performed even without a completed layout by using library information so long as an approximate area ratio of each instance is provided. For example, verification of the area ratio/occupancy ratio can be performed with registered library information of an approximate area ratio of an analog block even when a layout of the analog block has not been completed. That is, adjustment of the area ratio/occupancy ratio with a dummy pattern can be performed before completion of the layout.

In a pattern generation method of the present invention, a dummy pattern which attains a target value of the pattern area ratio or pattern occupancy ratio is actually placed in an unoccupied region of the semiconductor integrated circuit device or in an unoccupied region of each instance based on a result of any of the above area ratio/occupancy ratio verification methods. In this process, a standard cell which has no relation to a circuit operation of the semiconductor integrated circuit device when actually used may be placed instead of the dummy pattern.

According to the present invention, a dummy pattern is virtually placed, and hierarchal processing is performed using the area ratio of each instance in each layer of a chip as library information, whereby it can be quickly determined with high accuracy whether or not the target value of the area ratio or occupancy ratio which is defined by the process before placement of the dummy pattern is attained. Thus, a layout of a semiconductor device in which the target value of the area ratio/occupancy ratio is attained is automatically obtained by actually generating a dummy pattern only one time.

As described above, the present invention relates to area ratio/occupancy ratio verification for generation of a semiconductor device pattern, wherein it can be quickly determined with high accuracy before placement of a dummy pattern whether or not the target value of the area ratio/occupancy ratio which is defined by the process is attained. Thus, the present invention is especially useful for a short TAT (turn-around-time) chip design in microprocessing.

BRIEF DESCRIPTION OF THE DRAWINGS

FIG. 17 shows the instance perimeter portion divided into smaller sections for verifying the area ratio/occupancy ratio with higher accuracy in the area ratio/occupancy ratio verification method according to embodiment 3 of the present invention.

DESCRIPTION OF THE PREFERRED EMBODIMENTS

Embodiment 1

Hereinafter, an area ratio/occupancy ratio verification method according to embodiment 1 of the present invention is described with reference to the drawings.

Figure 1:
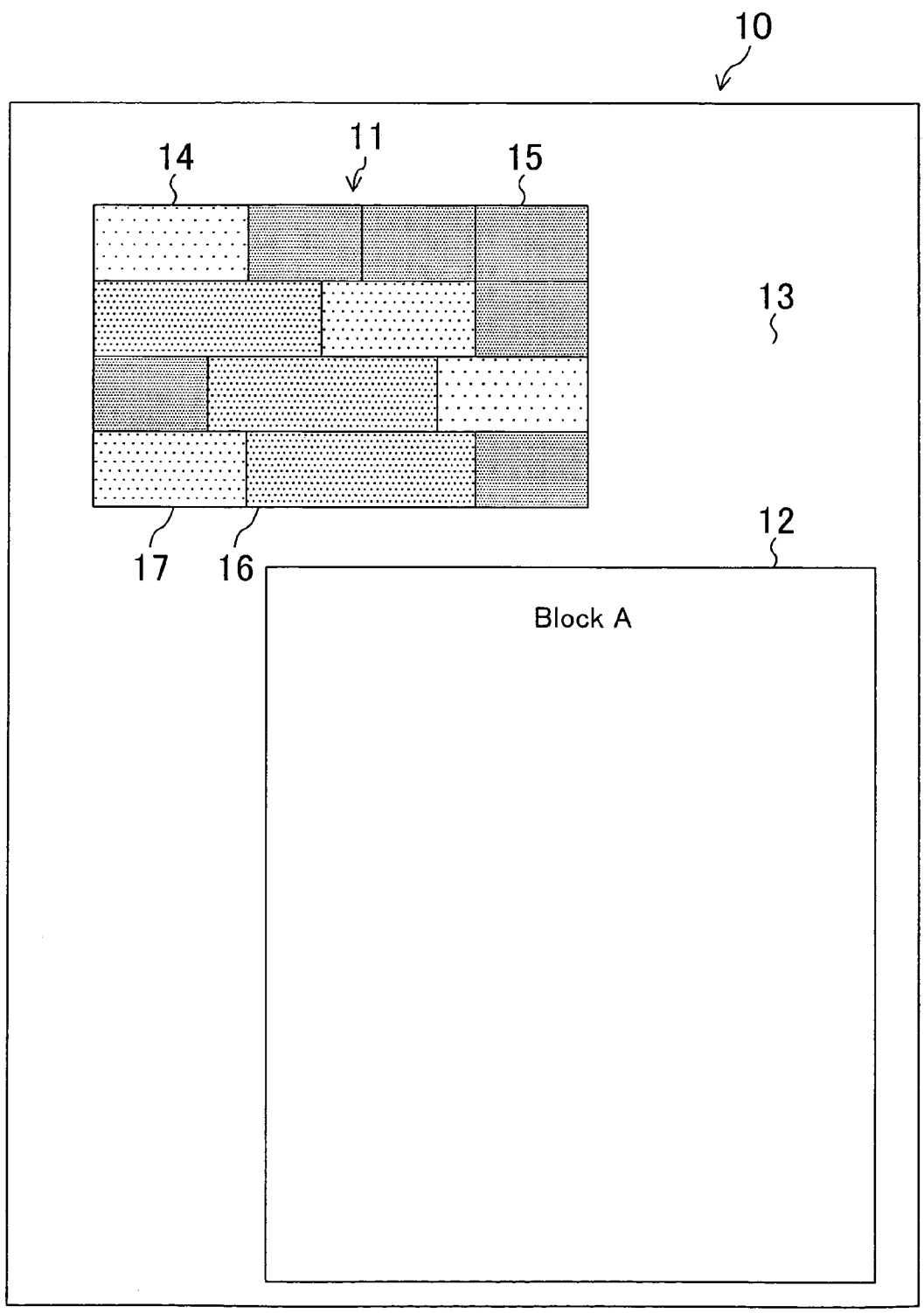
FIG. 1 shows a layout of a semiconductor integrated circuit device (chip) which is to be subjected to an area ratio/occupancy ratio verification method according to embodiment 1 of the present invention.

FIG. 1 shows a typical layout of a semiconductor integrated circuit device (chip) which is to be verified using an area ratio/occupancy ratio verification method of embodiment 1. As shown in FIG. 1, a chip 10 is formed by a combination of a standard cell region 11 and a block region 12, such as SRAM (static random access memory), DRAM (dynamic random access memory), or the like. Further, there is an unoccupied region 13 over the chip 10 in which none of the standard cell region 11 and the block region 12 (block A) is placed. In embodiment 1, the standard cell region 11 includes, for example, a first instance 14 (instance A), a second instance 15 (instance B), a third instance 16 (instance C) and a fourth instance 17 (instance D).

Figure 2:
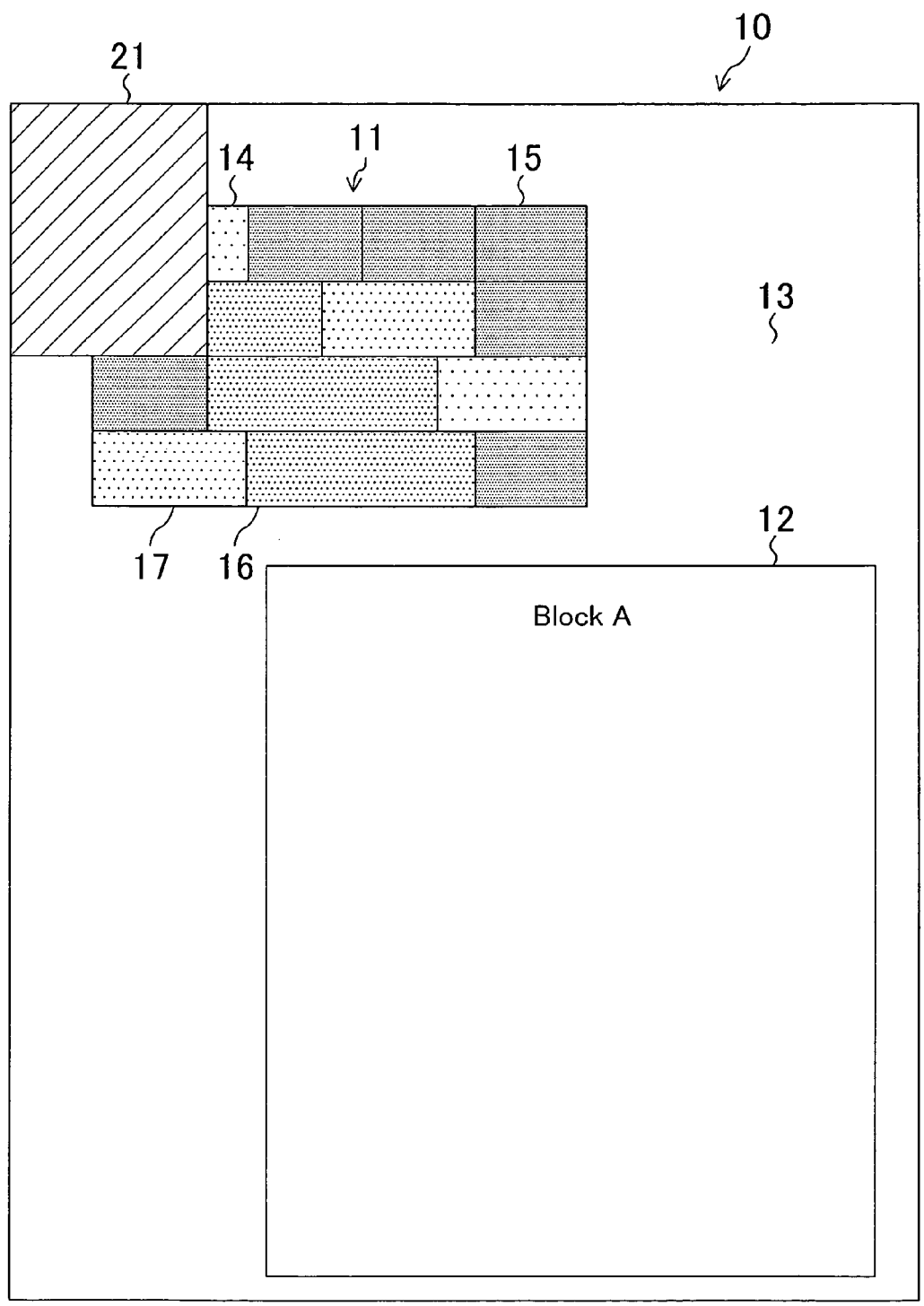
FIG. 2 shows a check window prepared for performing area ratio/occupancy ratio verification on the layout of FIG. 1.

FIG. 2 shows a check window prepared for performing the area ratio/occupancy ratio verification on the layout of FIG. 1. As shown in FIG. 2, the check window 21 used for executing pattern occupancy ratio verification is, in many cases, set to be superposed on both the standard cell region 11 and the unoccupied region 13.

Figure 3:
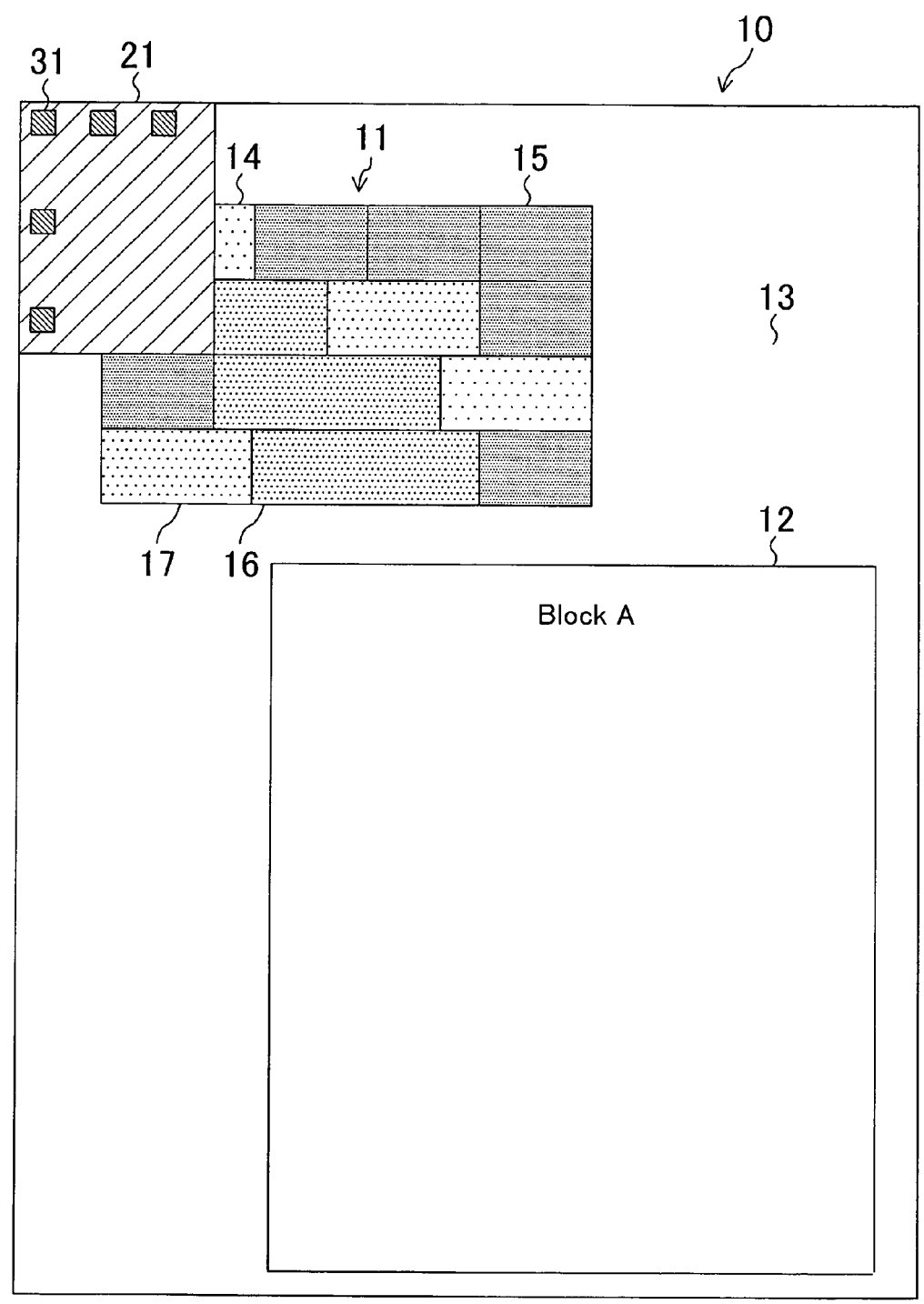
FIG. 3 shows a chip layout obtained when a dummy pattern is placed in the check window of FIG. 2.

FIG. 3 shows a dummy pattern placed in the check window of FIG. 2. As shown in FIG. 3, the dummy pattern 31 defined by the process conditions, for example, is provided in the unoccupied region 13 of the check window 21 for each layer. It should be noted that a feature of embodiment 1 resides in that the occupancy ratio, or the like, is calculated to verify the area ratio/occupancy ratio on the assumption that the dummy pattern is placed as shown in FIG. 3, without actually placing the dummy pattern on a computer with a CAD system, or the like. Hereinafter, the features of embodiment 1 are described in detail.

Figure 4:
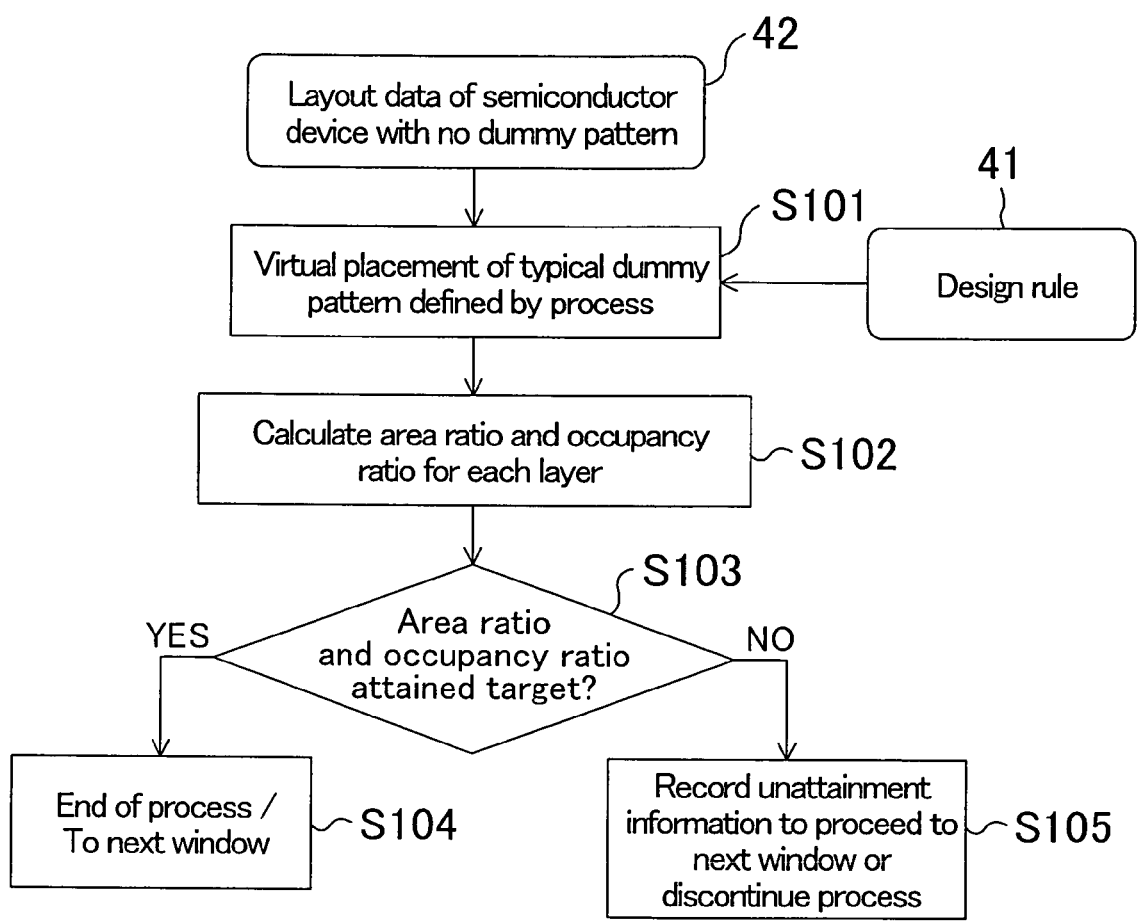
FIG. 4 is a flowchart of the area ratio/occupancy ratio verification method according to embodiment 1 of the present invention.

FIG. 4 is a flowchart of the area ratio/occupancy ratio verification method according to embodiment 1.

First, in the case where it is determined based on the design rule 41 and the layout data (the layout data of a semiconductor device which has no dummy pattern) 42 that only generation of a rectangular dummy pattern 31 as shown in FIG. 3 is permitted, an assumption is made that the dummy pattern 31 is placed in the unoccupied region 13 of the check window 21 (step S101). That is, the presence of the dummy pattern 31 which has a predetermined shape and a predetermined area is considered only in the calculation of the occupancy ratio at step S102, which will be described later, without placing the dummy pattern 31 on a computer.

Then, the pattern occupancy ratio in the check window 21 is calculated for each layer (step S102), and it is verified whether or not the pattern occupancy ratio has attained the target value in the check window 21 (step S103). If it is determined that the pattern occupancy ratio has attained the target value, the process with the check window 21 is terminated, and a process with the next check window is started (step S104). If it is determined that the pattern occupancy ratio has not attained the target value (target occupancy ratio unattained), error information (unattainment information indicating that the pattern occupancy ratio in the check window 21 has not attained the target value) is recorded or output to start a process with the next check window, or the area ratio/occupancy ratio verification process is discontinued (step S105).

By performing the processes of steps S101 to S105 for all of the check windows (data windows), the status of whether or not the target of the pattern occupancy ratio has been attained for each check window is provided. In addition, it is possible to perform calculation of the pattern area ratio in each layer over the entire chip and determination of the status of whether or not the target of the area ratio has been attained based on the pattern occupancy ratio information (area information) for all of the data windows.

In embodiment 1, the dummy pattern is not placed on a computer for checking the area ratio, or the like. Instead, the presence of the dummy pattern is only considered in the calculation of the occupancy ratio, or the like. Although in conventional techniques, an enormous length of time is required for placement of the dummy pattern (specifically, repetition of placement, verification, re-placement, reverification, . . . ) using a CAD system, or the like, such repetitious (retrogressive) efforts are unnecessary in embodiment 1. Therefore, the time required for area ratio/occupancy ratio verification is greatly reduced.

In embodiment 1, the processes of steps S101 to S105 are executed by a program on a computer which incorporates, for example, an arithmetic unit, such as a CPU, or the like, and a storage, such as a memory, or the like.

In embodiment 1, the dummy pattern 31 is virtually placed in the unoccupied region 13 of the chip 10. However, according to the present invention, the dummy pattern 31 may instead be virtually placed in an unoccupied region in an instance.

In embodiment 1, if it is determined at step S103 that the target of the occupancy ratio has not been attained, the occupancy ratio verification may be performed for all of the check windows, and the layout correction may then be performed, while the error information is output at step S105. Alternatively, the area ratio/occupancy ratio verification process may be discontinued at the time when it is determined at step S103 that the target of the occupancy ratio has not been attained. Selection between continuation and discontinuation of verification may be determined according to circumstances for a semiconductor device to be designed.

In embodiment 1, as described above, it is assumed that a rectangular dummy pattern is virtually placed based on the design rule 41, or the like. However, as a matter of course, virtual placement of an unrectangular dummy pattern is permitted in some processes or layers.

In embodiment 1, verification of the pattern area ratio over the entire chip may be directly executed based on a virtual placement of a dummy pattern without using a check window.

Variation of Embodiment 1

Hereinafter, an area ratio/occupancy ratio verification method according to a variation of embodiment 1 of the present invention is described with reference to the drawings.

The variation described herein is different from the above-described example of embodiment 1 in that, if it is determined at step S103 that the pattern occupancy ratio has not attained a target value in the check window 21 (target occupancy ratio unattained), the specifications for generation of the dummy pattern 31 are changed within a range permitted by the design rule (process rule), and area ratio/occupancy ratio verification is performed on an assumption that the dummy pattern 31 generated with the changed specifications is placed in the unoccupied region 13 of the check window 21. Hereinafter, embodiment 2 is specifically described.

Figure 7:
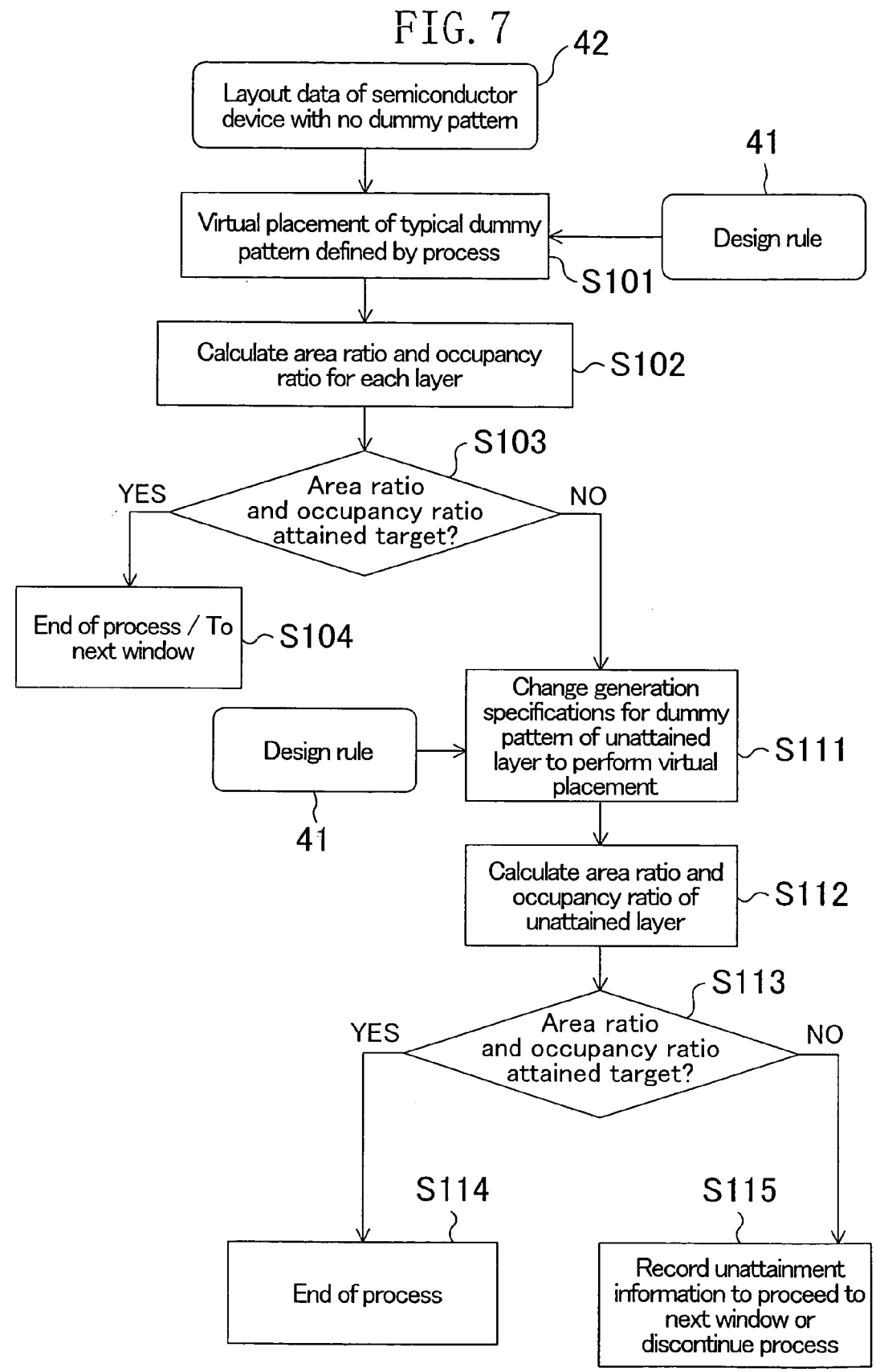
FIG. 7 is a flowchart of the area ratio/occupancy ratio verification method according to the variation of embodiment 1 of the present invention.

FIG. 7 is a flowchart of the area ratio/occupancy ratio verification method according to the variation of embodiment 1.

First, as in embodiment 1, an assumption is made that a rectangular dummy pattern 31 shown in FIG. 3, for example, is placed in the unoccupied region 13 of the check window 21 based on the design rule 41 and the layout data 42 (step S101).

Then, as in embodiment 1, the pattern occupancy ratio in the check window 21 is calculated for each layer (step S102), and it is verified whether or not the pattern occupancy ratio has attained the target value in the check window 21 (step S103).

If it is determined as a result of the verification that the pattern occupancy ratio has attained the target value, the process with the check window 21 is terminated, and a process with the next check window is started (step S104).

Figure 5:
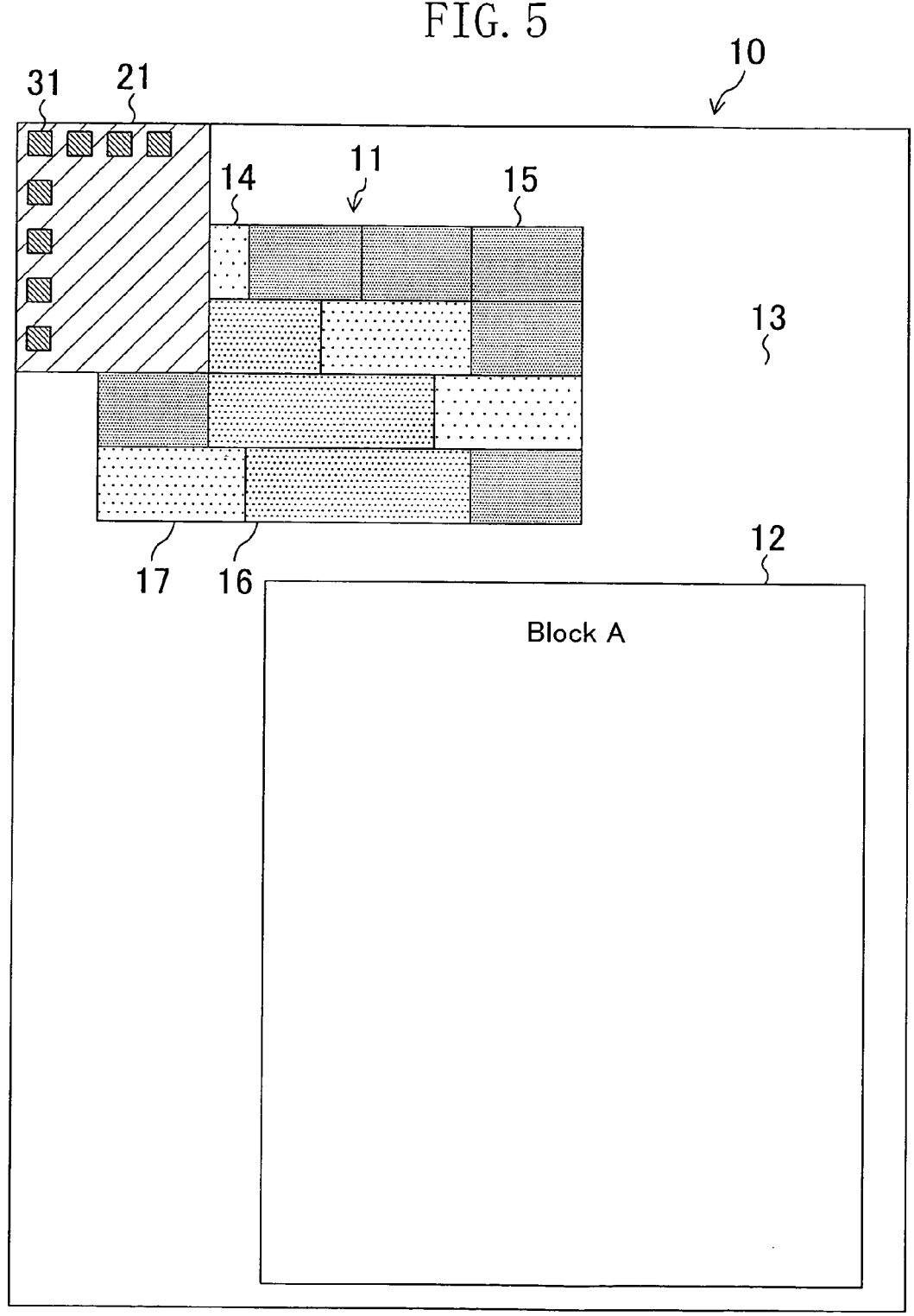
FIG. 5 shows a chip layout wherein the pitch of a dummy pattern is changed in the area ratio/occupancy ratio verification method according to embodiment 1 of the present invention.
Figure 6:
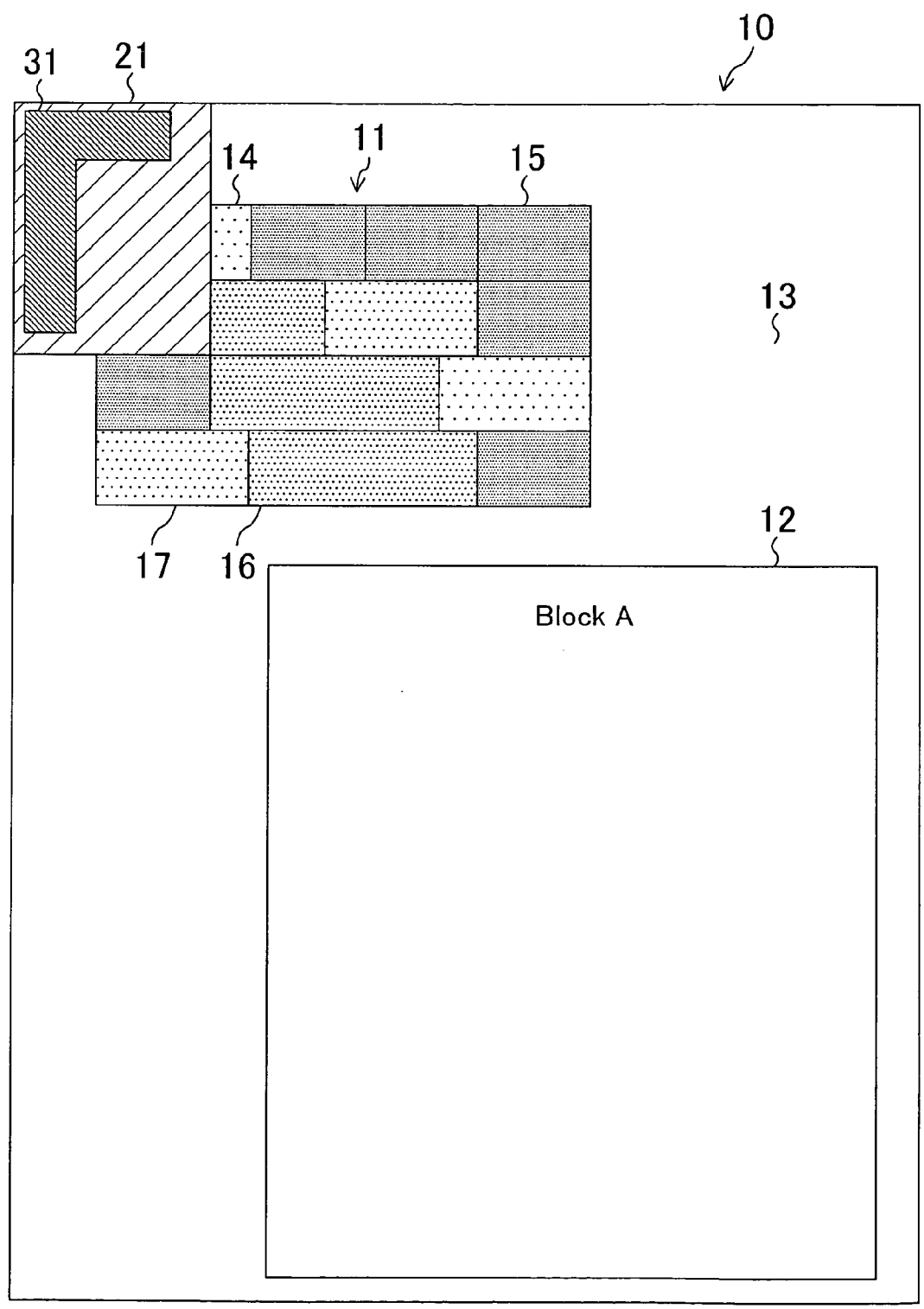
FIG. 6 shows a chip layout wherein the pitch of a dummy pattern is changed in an area ratio/occupancy ratio verification method according to a variation of embodiment 1 of the present invention.

If it is determined as a result of the verification that the pattern occupancy ratio has not attained the target value with the rectangular dummy pattern 31 shown in FIG. 3 (target occupancy ratio unattained), the specifications for generation of the dummy pattern 31 are changed within a range permitted by the design rule (process rule) 41 as for the layer in which the target value of the occupancy ratio has not attained (unattained layer), and an assumption is made that the dummy pattern 31 generated with the changed specifications is placed in the unoccupied region 13 of the check window 21 (step S111). Specifically, as shown in FIG. 5, the pitch of the rectangular dummy pattern 31 is changed (decreased or increased), or the shape of the dummy pattern 31 is changes within a range permitted by the design rule 41 as shown in FIG. 6.

After the generation specifications for the dummy pattern 31 have been changed, the pattern occupancy ratio of the unattained layer in the check window 21 is calculated (step S112). Then, it is determined whether or not the pattern occupancy ratio has attained the target value in the check window 21 (step S113).

If it is determined as a result of the verification that the pattern occupancy ratio has attained the target value, the process with the check window 21 is ended (step S114).

If it is determined as a result of the verification that the pattern occupancy ratio has not attained the target value (target occupancy ratio unattained), specifically, if it is determined that the target occupancy ratio has not been unattained even when the generation specifications for the dummy pattern 31 have been changed as much as possible within a range permitted by the design rule 41, error information (unattainment information indicating that the pattern occupancy ratio in the check window 21 has not attained the target value) is recorded or output to start a process with the next check window, or the area ratio/occupancy ratio verification process is discontinued (step S115).

In this variation, the generation specifications for the dummy pattern 31 are changed, whereby the target value of the pattern occupancy ratio in the check window 21 can be attained more securely.

It should be noted that, in embodiment 1 and the variation thereof, the target occupancy ratio value in the occupancy ratio verification with each check window is set to a value equal to the median of the area ratio range in the entire chip (e.g., 50% when the area ratio in the entire chip is within a range of 40% to 60%: hereinafter, referred to as "center value") or a value close to the median. With such a value, the target value of the area ratio in the entire chip can also be attained at the time when occupancy ratio verification is completed for all of the check windows.

Embodiment 2

Hereinafter, an area ratio/occupancy ratio verification method according to embodiment 2 of the present invention is described with reference to the drawings.

A feature of embodiment 2 resides in that the area of each instance and the area ratio of each instance in each layer of a chip are obtained as library information in advance before the layout of a chip is generated, i.e., before the area ratio/occupancy ratio verification of embodiment 1 or its variation is performed, and the library information is used in the area ratio/occupancy ratio verification. Herein, the area ratio of the instance means the ratio (%) of the area occupied by the wiring pattern, or the like, of an instance to the area occupied by the instance.

Figure 8:
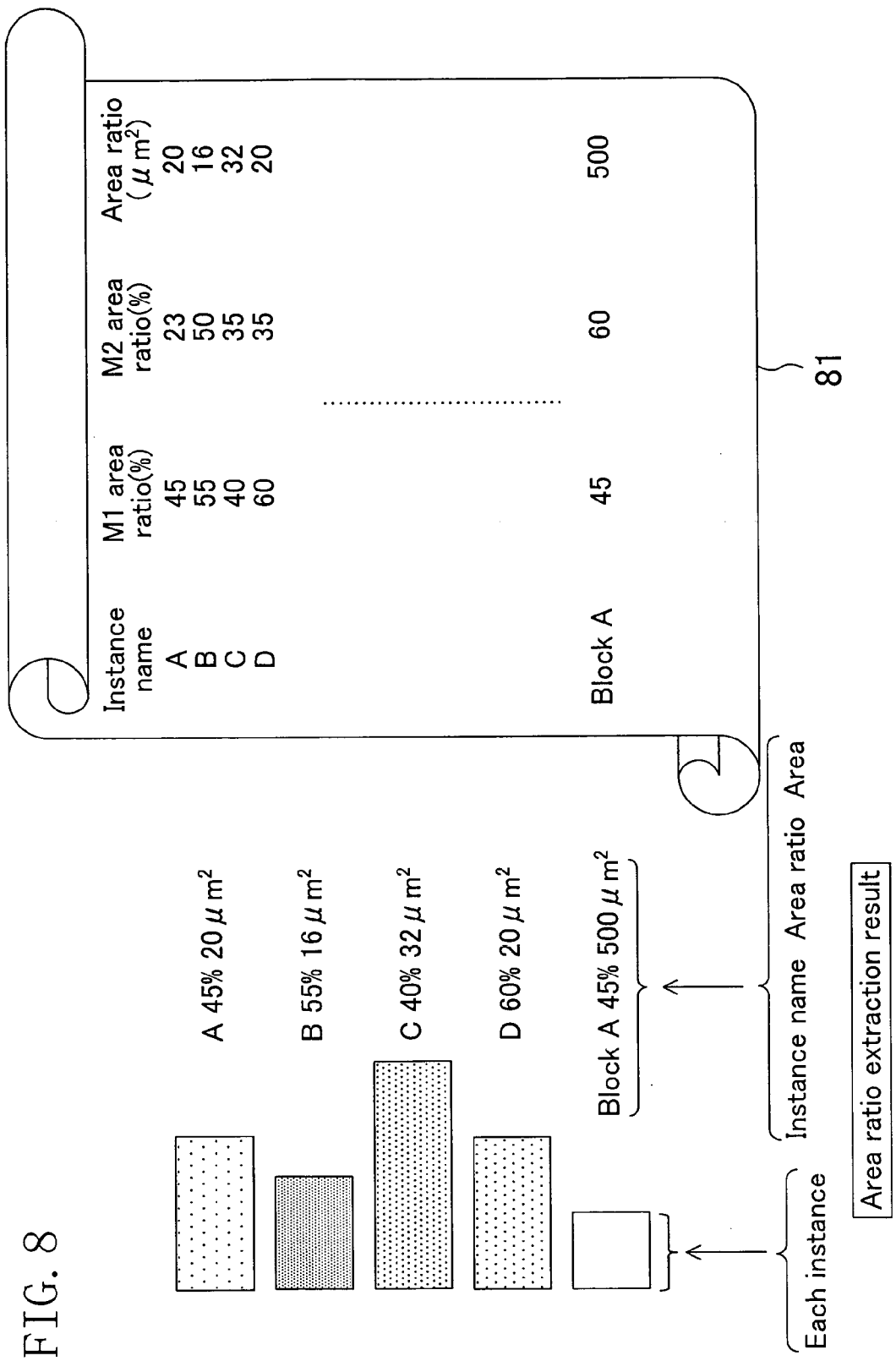
FIG. 8 schematically shows library information obtained in an area ratio/occupancy ratio verification method according to embodiment 2 of the present invention.

FIG. 8 schematically shows an example of the library information of embodiment 2, which is obtained for the first instance 14 (instance A), the second instance 15 (instance B), the third instance 16 (instance C) and the fourth instance 17 (instance D) that constitute the standard cell region 11 of FIG. 1, and the block region 12 (block A). In FIG. 8, M1 and M2 each denotes a metal wiring layer. In embodiment 2, it is assumed in consideration of the calculation speed in a calculation process of the area ratio/occupancy ratio which is to be performed later that the area ratio of each instance in each layer has the same value at any point in the layer.

Hereinafter, a method for calculating an actual area ratio/occupancy ratio (specifically, a method for calculating the pattern occupancy ratio) using library information 81 of FIG. 8 is described with reference to FIG. 9. It should be noted that in FIG. 9 like elements are denoted by like reference numerals used in embodiment 1 shown in FIG. 1, and therefore, descriptions thereof are herein omitted.

Figure 9:
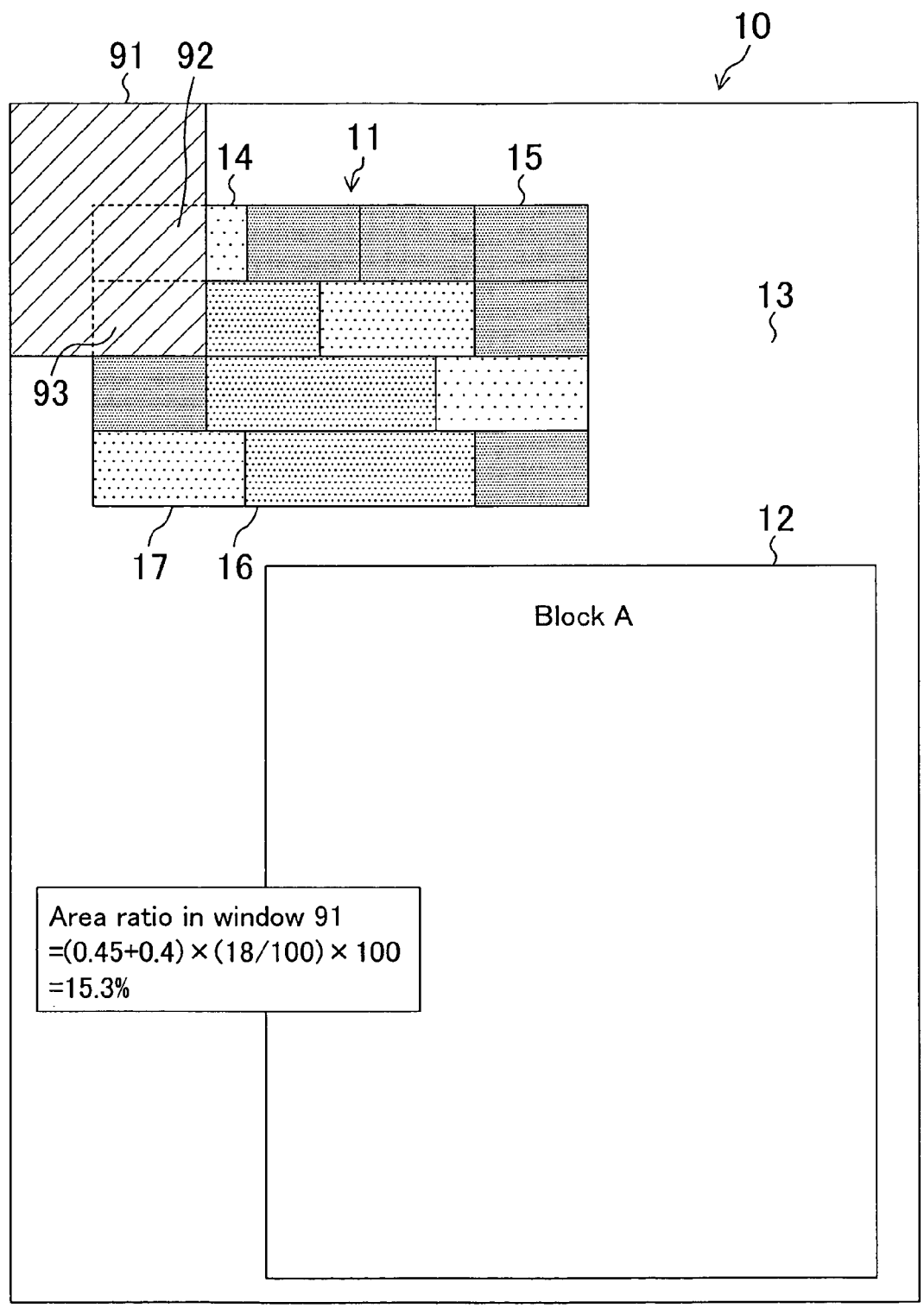
FIG. 9 illustrates the area ratio/occupancy ratio verification method according to embodiment 2 of the present invention wherein the library information of FIG. 8 is used.

As shown in FIG. 9, in the calculation of the pattern occupancy ratio in each layer in a check window 91, the area ratio and the area of each of the instances 14 and 16 (instances A and C), which overlap with the check window 91, are extracted from the library information 81 which has been obtained beforehand.

Now, consider an example where the check window 91 is a square window, each side of which is 10 µm (area: 100 µm²), and each of the overlapped areas 92 and 93 of the check window 91 and the instances 14 and 16 is 18 µm². In this case, the pattern area ratio of metal wiring layer M1 (the pattern occupancy ratio of metal wiring layer M1 in the check window 91) is:

(Pattern occupancy ratio of M1)=(0.45+0.4)×(18/100)×100=15.3%

According to embodiment 2, such calculation is performed for all of the windows in each layer, whereby verification of the pattern occupancy ratio and pattern area ratio verification over the entire chip can be performed at a high speed by hierarchal processing (processing for instance/processing for check window/processing for chip).

According to embodiment 2, even if the layout is not completed, verification of the area ratio/occupancy ratio can be performed using the library information so long as an approximate area ratio of each instance is obtained. For example, even if the layout of an analog block is not completed, verification of the area ratio/occupancy ratio can be performed so long as an approximate area ratio of the analog block is registered as library information. That is, adjustment of the area ratio/occupancy ratio can be performed using a dummy pattern before completion of the layout.

Variation of Embodiment 2

Hereinafter, an area ratio/occupancy ratio verification method according to a variation of embodiment 2 of the present invention is described with reference to the drawings.

This variation is different from the previously-described example of embodiment 2 in that, for the purpose of executing area ratio/occupancy ratio verification with high accuracy, each instance is divided, and the area of each divisional region and the area ratio of each divisional region in each layer of the chip are obtained as library information.

Figure 10:
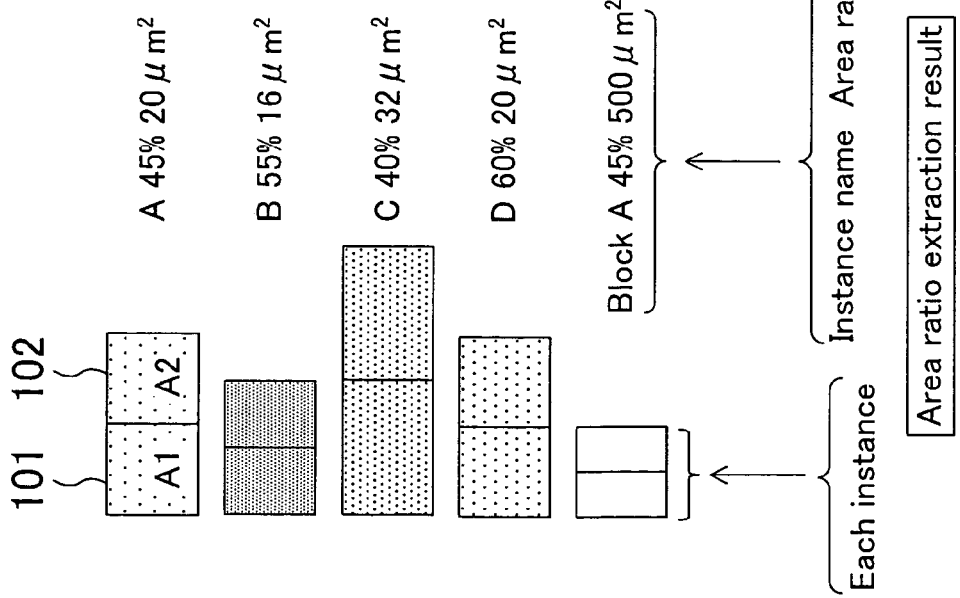
FIG. 10 schematically shows detailed library information obtained in an area ratio/occupancy ratio verification method according to a variation of embodiment 2 of the present invention.

FIG. 10 schematically shows an example of the library information of this variation of embodiment 2, which is obtained for the first instance 14 (instance A), the second instance 15 (instance B), the third instance 16 (instance C) and the fourth instance 17 (instance D) that constitute the standard cell region 11 of FIG. 1, and the block region 12 (block A). In FIG. 10, M1 and M2 each denotes a metal wiring layer.

For example, in the case where the first instance 14 (instance A) is halved, the area and the area ratio in each layer are calculated for each of the divisional region 101 (divisional region A1) and the divisional region 102 (divisional region A2) which are obtained by dividing (halving) the instance 14. The results of calculation are registered as library information 103.

A method for calculating an actual area ratio/occupancy ratio using the library information 103 is the same as that described in the previously-described example of embodiment 2.

This variation of embodiment 2 is extremely effective for a case where the area ratio is not uniform (the area ratio has a variation) in an instance in a certain layer. Specifically, in the case of the first instance 14 (instance A), if the instance 14 is not divided (as in embodiment 2), the area ratio in metal wiring layer M1 is 45% at any position in layer M1. However, when the instance 14 is divided (as in this variation), the area ratio of the divisional region 101 (divisional region A1) is 53%, and the area ratio of the divisional region 102 (divisional region A2) is 37%. Thus, in the case where the entirety of the divisional region 101 overlaps with the check window (and the entirety of the divisional region 102 does not overlap with the check window), if the instance 14 is not divided, the pattern occupancy ratio, or the like, is calculated on an assumption that the area ratio is 45%. If the instance 14 is divided, the pattern occupancy ratio, or the like, is calculated with an assumption that the area ratio of the divisional region 101 (divisional region A1) is 53%. That is, according to this variation of embodiment 2, calculation of the pattern occupancy ratio, or the like, can be performed with higher accuracy.

It should be noted that, in embodiment 2 and its variation, the processes of calculation and registration of library information, or the like, are executed by a program on a computer which incorporates, for example, an arithmetic unit, such as a CPU, or the like, and a storage, such as a memory, or the like.

Embodiment 3

Hereinafter, an area ratio/occupancy ratio verification method according to embodiment 3 of the present invention is described with reference to the drawings.

Figure 11:
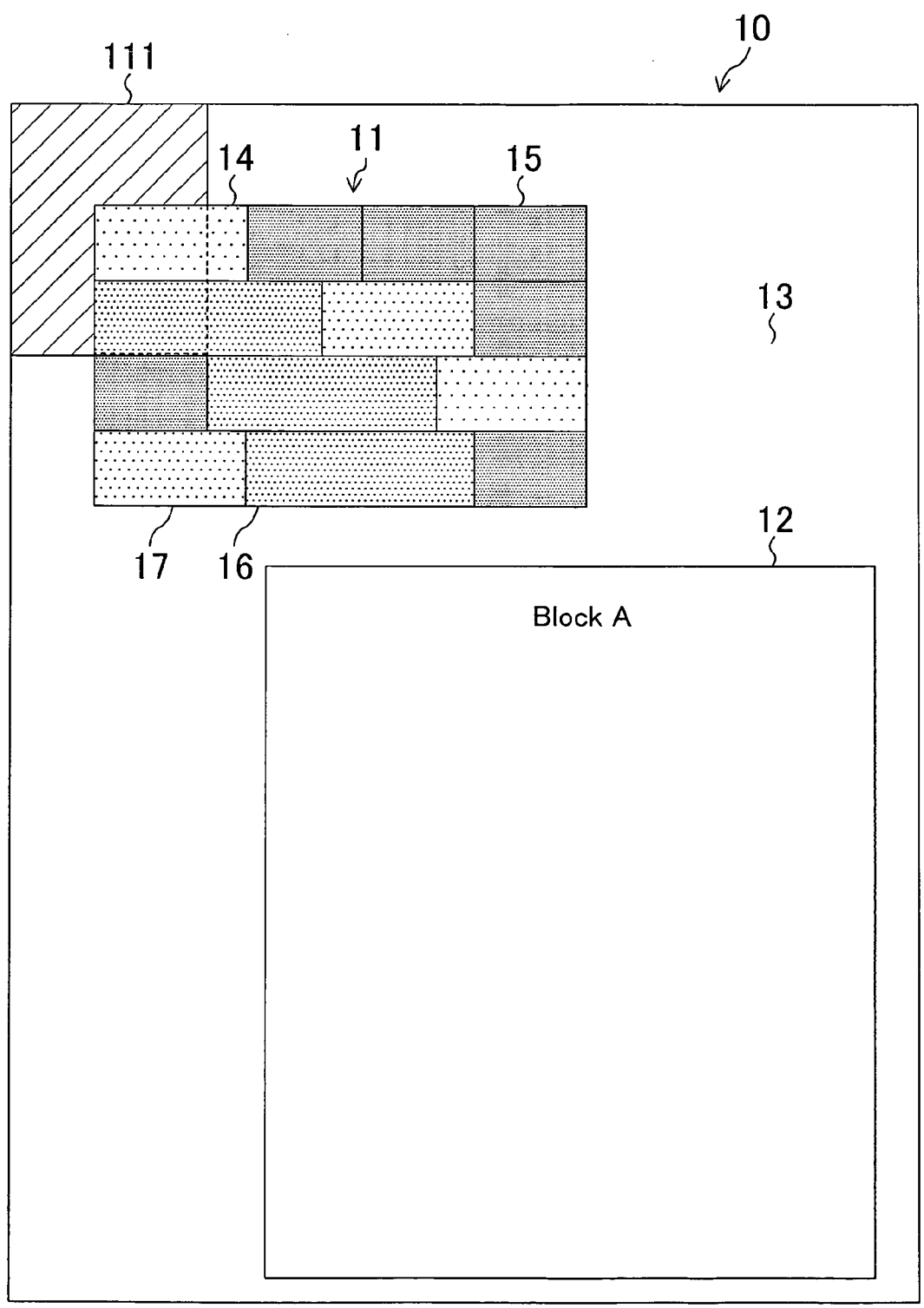
FIG. 11 shows an unoccupied region outside an instance in a layout of a semiconductor integrated circuit device (chip) which is to be subjected to an area ratio/occupancy ratio verification method according to embodiment 3 of the present invention.

In the area ratio/occupancy ratio verification method of embodiment 3, hierarchal processing is performed using library information described in embodiment 2 and its variation. In this processing, according to embodiment 3, as shown in FIG. 11, the inside of each instance is considered as a black box, and adjustment of the area ratio/occupancy ratio is performed using only the unoccupied region 13 which is outside the instances of the chip 10 (precisely, only an unoccupied region 111 of the unoccupied region 13, which overlaps with the check window). Specifically, the dummy pattern which has been described in embodiment 1 and its variation is virtually placed in the unoccupied region 111, and hierarchal processing of area ratio/occupancy ratio verification is executed using the above-described library information. Hereinafter, this process is specifically described.

Figure 12:
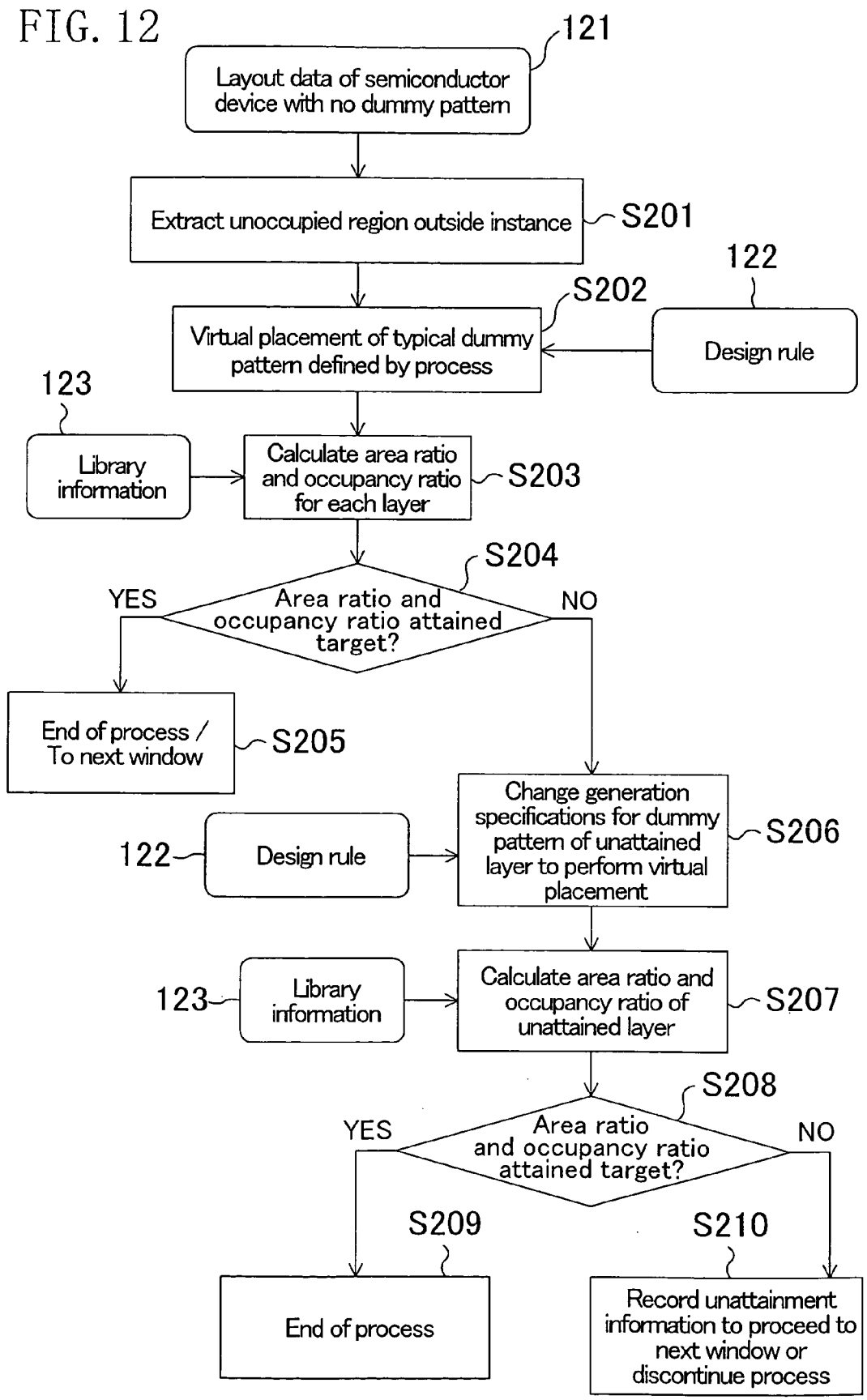
FIG. 12 is a flowchart of the area ratio/occupancy ratio verification method according to embodiment 3 of the present invention.

FIG. 12 is a flowchart of the area ratio/occupancy ratio verification method according to embodiment 3.

In the first place, an unoccupied region which is outside the instance inside the check window used for verification of the pattern occupancy ratio is extracted based on layout data 121 (layout data of a semiconductor device having no dummy pattern) (step S201). Then, a typical dummy pattern defined by the process conditions is virtually placed in the unoccupied region extracted at step S201 according to a design rule 122 (step S202).

Then, the pattern occupancy ratio of each layer in a check window is calculated using library information 123 (step S203). It is verified whether or not the pattern occupancy ratio in the check window has attained the target value (step S204). In the calculation of the pattern occupancy ratio at step S203, the process time is greatly reduced by using the library information 123 which has been described in embodiment 2.

If it is determined as a result of the verification at step S204 that the target value of the pattern occupancy ratio has been attained, the process with the current check window is terminated, and the process with the next check window is started (step S205).

On the other hand, if it is determined as a result of the verification that the target value of the pattern occupancy ratio has not been attained (target occupancy ratio unattained), the processes that are the same as those of the variation of embodiment 1 are performed. Specifically, as for the layer in which the target value of the occupancy ratio has not attained (unattained layer), the generation specifications for a dummy pattern are changed within a range permitted by the design rule 122 such that a dummy pattern generated with the changed specifications is virtually placed within an unoccupied region (outside the instances) in the check window (step S206).

The pattern occupancy ratio of the unattained layer in the check window is calculated using the library information 123 (step S207). It is verified whether or not the target value of the pattern occupancy ratio in the check window has been attained after the change of the dummy pattern generation specifications (step S208). Also in the calculation of the pattern occupancy ratio at step S207, high speed processing can be realized by using the library information 123 which has been described in embodiment 2.

If it is determined as a result of the verification that the target value of the pattern occupancy ratio has been attained, the process with the check window is terminated (step S209).

If it is determined as a result of the verification that the target value of the pattern occupancy ratio has not been attained (target occupancy ratio unattained), specifically if it is determined that the target value of the pattern occupancy ratio has not been attained even after the dummy pattern generation specifications have been changed as much as possible within a range permitted by the design rule 122, error information (unattainment information indicating that the pattern occupancy ratio in the check window has not attained the target value) is recorded or output to start the process with the next check window, or the area ratio/occupancy ratio verification process is discontinued (step S210).

By performing the processes of steps S201 to S210 for all of the check windows (data windows), the status of whether or not the target of the pattern occupancy ratio has been attained for each check window is provided. In addition, it is possible to perform calculation of the pattern area ratio in each layer over the entire chip and determination of the status of whether or not the target of the area ratio has been attained based on the pattern occupancy ratio information (area information) for all of the data windows.

Figure 13:
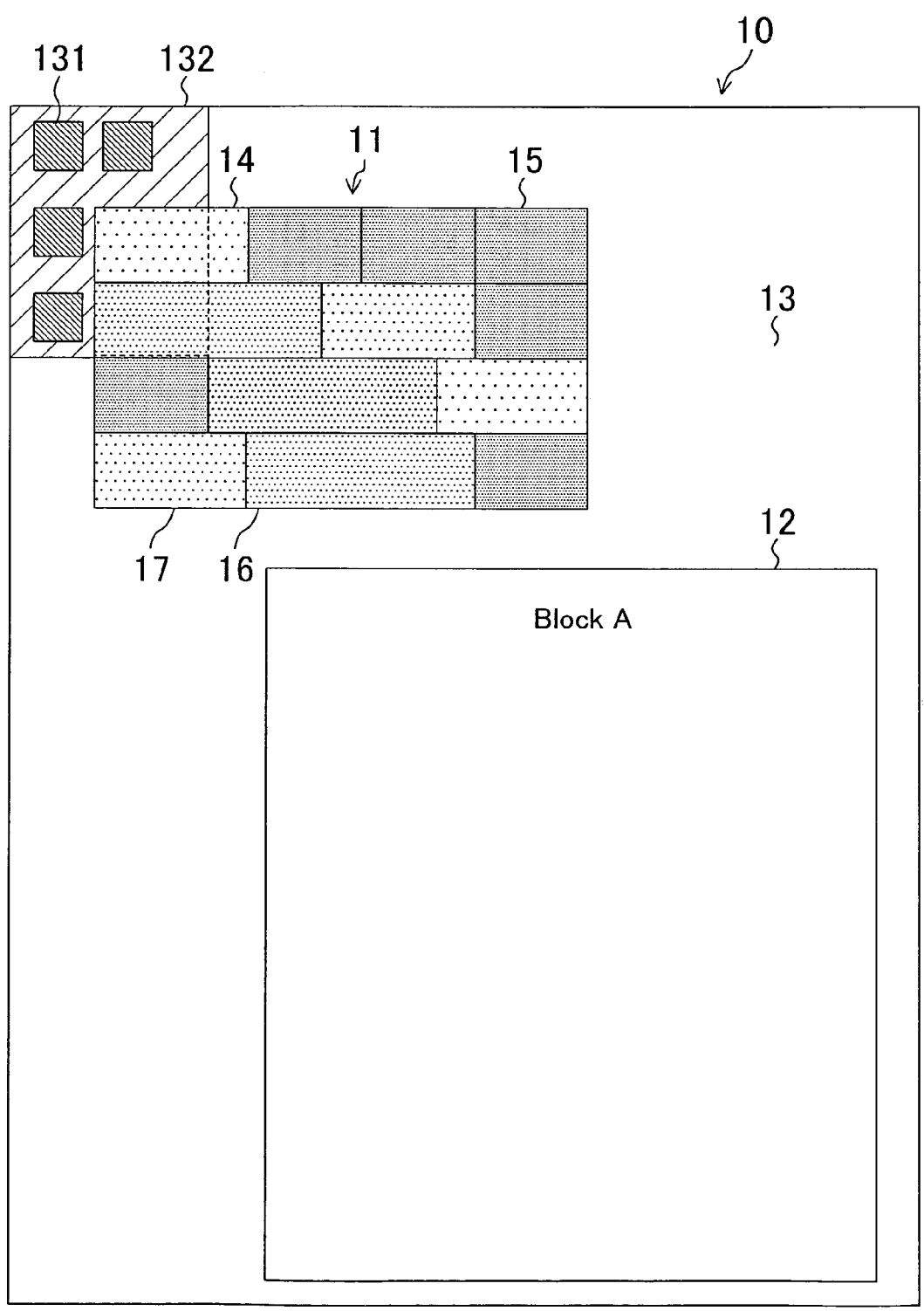
FIG. 13 illustrates the area ratio/occupancy ratio verification method according to embodiment 3 of the present invention.

Now, as an example, a method for calculating the area ratio (pattern occupancy ratio) of metal wiring layer M1 in a check window 132 of FIG. 13 is described. It should be noted that the layout shown in FIG. 13 is equivalent to the layout of FIG. 9, which uses the library information 81 of embodiment 2 shown in FIG. 8. The check window 132 is a square window, each side of which is 10 μm (area: 100 μm$^2$).

It is assumed that the target value of the pattern area ratio over the entire chip as to metal wiring layer M1 is set in a range of 30% to 70%, and it is verified whether or not the above-described pattern occupancy ratio can attain the target value. In the case where a dummy pattern 131 is virtually placed such that 50% of an unoccupied region (outside the instances) of the check window 132 is occupied by the dummy pattern 131, the pattern occupancy ratio of metal wiring layer M1 is calculated as follows:

$$\text{(Pattern occupancy ratio of } M1) = ((0.45 + 0.4) \times 18 + 0.5 \times (100 - 18 \times 2))/100 \times 100$$
$$= 47.3\%$$

Thus, it is seen that the target value of the pattern occupancy ratio (30% to 70%) can be attained in the check window 132 according to the placement of the dummy pattern which occupies the 50% of the unoccupied region. That is, it is only necessary to actually place the above-described virtually-placed dummy pattern 131 in the check window 132 in metal wiring layer M1. Alternatively, information about a placeable dummy pattern, such as the dummy pattern 131, or the like, may be recorded or output for each window till verification with all the check windows is completed, and at the time when the verification with all the check windows is completed, generation and placement of a dummy pattern may be actually performed based on the information recorded or output for each window.

As for a huge instance, such as an analog region, or the like, it is hardly considered that the area ratio in each layer is uniform over the entire area of the instance.

Figure 14:
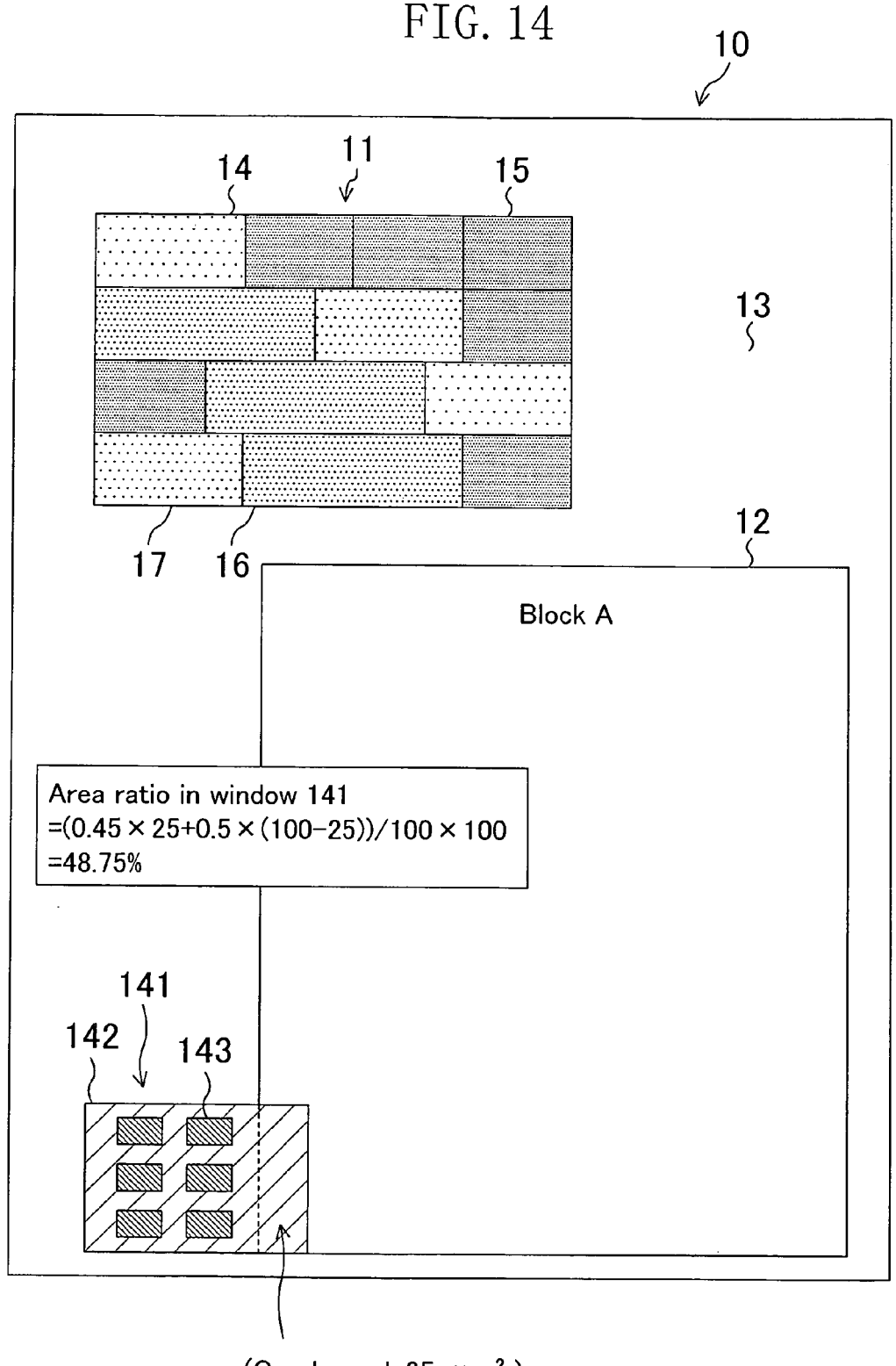
FIG. 14 illustrates problems in library information used in the area ratio/occupancy ratio verification method according to embodiment 3 of the present invention.

For example, in the case where a check window 141 shown in FIG. 14 overlaps the block region 12 (block A) with an overlapped area of 25 µm², the pattern occupancy ratio of metal wiring layer M1 in the check window 141 is calculated as follows. It should be noted that the layout shown in FIG. 14 is equivalent to that of FIG. 9, and the library information 81 of embodiment 2 shown in FIG. 8 is used in the calculation described below. The check window 141 is a square window, each side of which is 10 µm (area: 100 µm²).

In the case where a dummy pattern 143 is placed in the check window 141 such that 50% of an unoccupied region 142 (outside the instances) is occupied by the dummy pattern 143, the pattern occupancy ratio of metal wiring layer M1 is calculated using the area ratio of block A which is extracted from the library information 81 (45% in metal wiring layer M1):

$$\text{(Pattern occupancy ratio of } M1) = (0.45 \times 25 + 0.50 \times$$
$$(100 - 25))/100 \times 100$$
$$= 48.75\%$$

However, this calculation result is effective only when the area ratio of block A in metal wiring layer M1 is uniform (free from variation).

Figure 15:
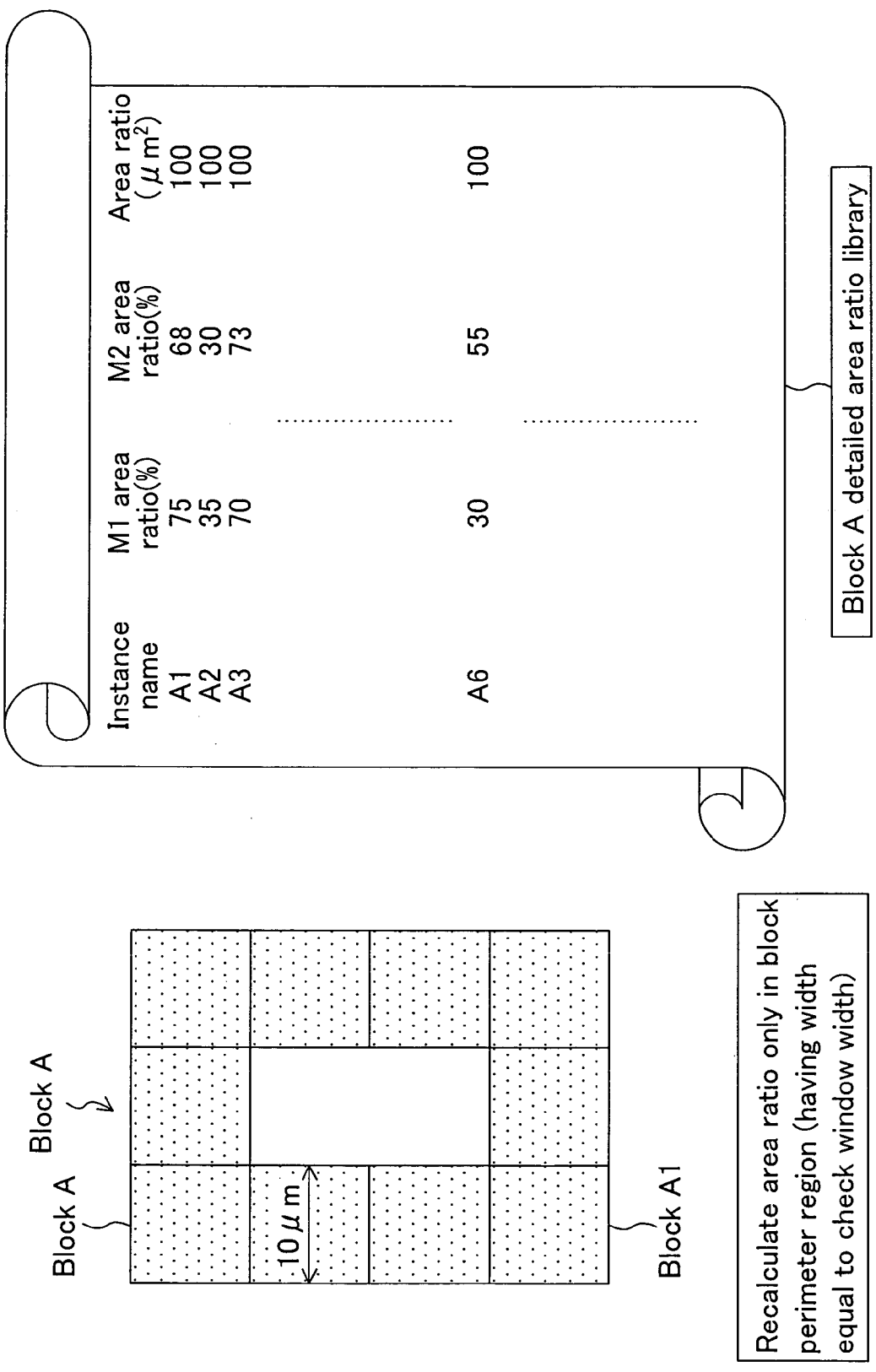
FIG. 15 schematically shows detailed library information obtained in an area ratio/occupancy ratio verification method according to a variation of embodiment 3 of the present invention.

In order to achieve more accurate calculation of the area ratio/occupancy ratio, it is only necessary to divide each instance and obtain the area of each divisional region and the area ratio of each divisional region in each layer of the chip as library information as shown in FIG. 10 (variation of embodiment 2). However, as for a huge instance (specifically, block A), detailed area ratio information in each layer of the chip as to the donut-shaped perimeter region (specifically, small blocks A1, . . . , A4, . . . of block A) which has a width equal to that of the check window in the instance (e.g., 10 µm) is obtained as library information as shown in FIG. 15. This is because, in embodiment 3, a region in which the dummy pattern can be placed is limited to an unoccupied region that is outside the instances, and when the check window does not cover the unoccupied region, i.e., when the check window only covers the instances, virtual placement of the dummy pattern is not performed, and therefore, it is not necessary to perform precise occupancy ratio verification (i.e., occupancy ratio adjustment with dummy pattern). Thus, only for a region in a check window in which occupancy ratio adjustment with dummy pattern generation can be performed (in the case of an instance, the perimeter region having a width equal to that of the check window), detailed area ratio information of the region is obtained and used as library information, whereby the time required for calculation of the occupancy ratio, or the like, can be reduced. In the case where it is desirable that the pattern area ratio over the entire chip is obtained with high accuracy, it is possible that an instance in a check window which does not cover an unoccupied region is divided to obtain the area ratio, and the result is converted to library information.

Figure 16:
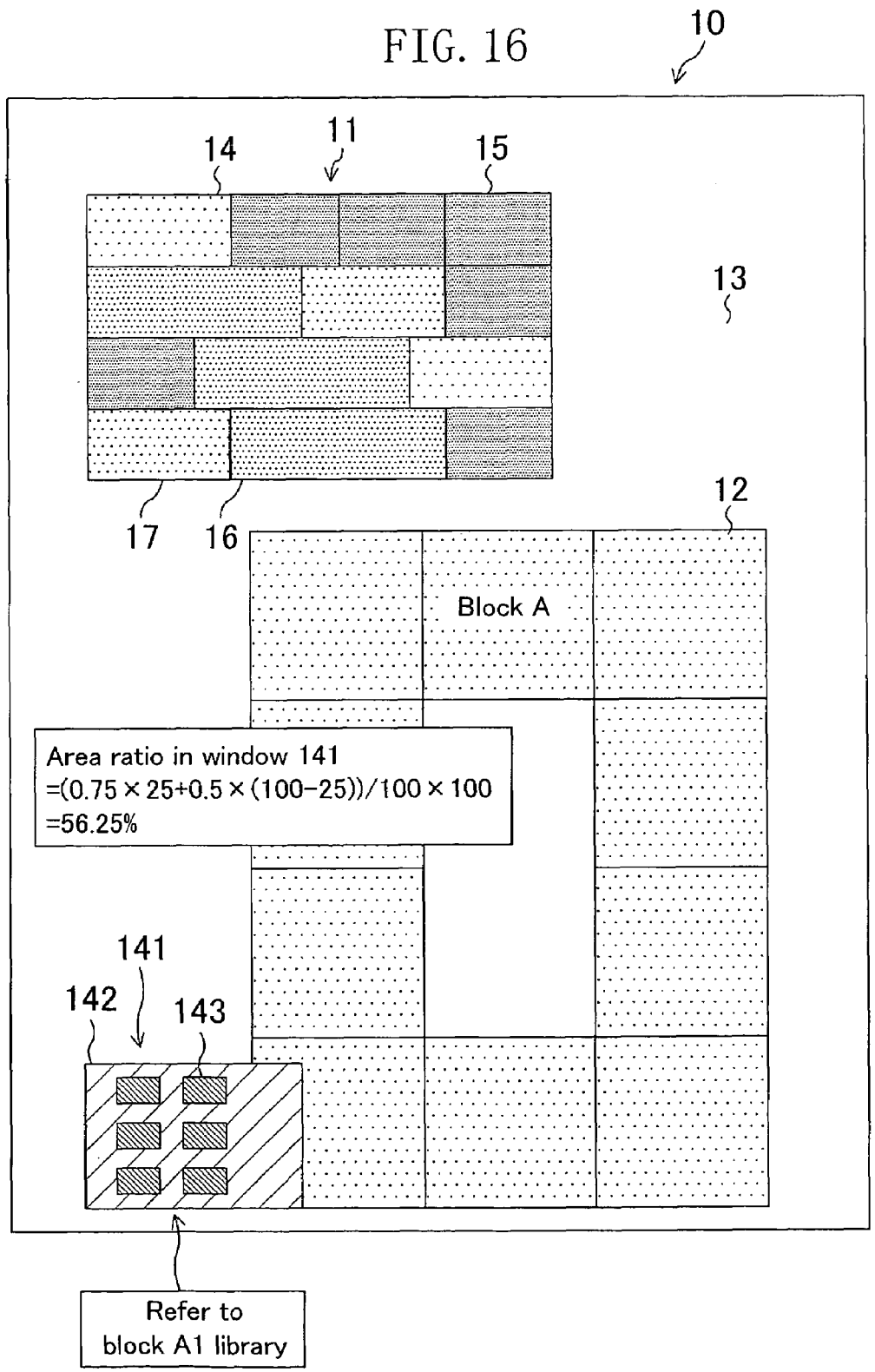
FIG. 16 illustrates the area ratio/occupancy ratio verification method according to embodiment 3 of the present invention wherein the library information of FIG. 15 is used.

Now, consider a case where, in the example of FIG. 14, the target value of the pattern occupancy ratio of metal wiring layer M1 in the check window 141 is 50% or higher. In this case, if detailed area ratio information of the perimeter region of block A is not obtained (if library information is not divided), the pattern occupancy ratio of metal wiring layer M1 is 48.75%, which does not attain the target value. On the other hand, in the case where detailed area ratio information of the perimeter region of block A is obtained as shown in FIG. 15, the pattern occupancy ratio of metal wiring layer M1 in the check window 141 is calculated as shown below in consideration that the check window 141 overlaps small block A1 of the block region 12 (block A) with an overlapped area of 25 µm² as shown in FIG. 16. It should be noted that the layout shown in FIG. 16 is equivalent to that of FIG. 9. The library information 81 of embodiment 2 shown in FIG. 8 and the detailed area ratio library information of block A shown in FIG. 15 are used in the calculation described below.

In the case where the dummy pattern 143 is virtually placed in the check window 141 such that 50% of the unoccupied region 142 (outside the instances) is occupied by the dummy pattern 143, the pattern occupancy ratio of metal wiring layer M1 is calculated using the area ratio of small block A1 which is extracted from the detailed area ratio library information of block A (75% in metal wiring layer M1):

$$\text{(Pattern occupancy ratio of } M1) = (0.75 \times 25 + 0.50 \times$$
$$(100 - 25))/100 \times 100$$
$$= 56.25\%$$

Thus, it is seen that, in the check window 141, the pattern occupancy ratio of metal wiring layer M1 has attained the target value (50% or higher). In this case, if the target value of the pattern occupancy ratio is not attained, it is only necessary to perform the processes which are the same as those of step S206 and subsequent steps shown in FIG. 12.

In the case where it is desirable that verification of the area ratio/occupancy ratio is performed with higher accuracy, it is possible that the perimeter region of a target instance (specifically, block A; which has a width equal to that of the check window) is divided into smaller divisions as shown in FIG. 17, and the detailed area ratio information is obtained as library information.

As described above, according to embodiment 3, verification of the area ratio/occupancy ratio can be performed at a high speed and with high accuracy by a combination of a method of embodiment 1 and its variation, wherein the area ratio/occupancy ratio is verified with a virtually-placed dummy pattern, and a method of embodiment 2 and its variation, wherein the area ratio/occupancy ratio is obtained using library information. In the case where the target value of the area ratio/occupancy ratio has not been attained, it is possible to suspend the verification process to make a layout correction before a dummy pattern is actually generated and placed. Accordingly, wasteful retrogressive efforts are removed.

Although in the above-described example of embodiment 3 a dummy pattern is virtually placed to calculate the pattern occupancy ratio in a window, it is possible instead that the area of a dummy pattern which is necessary for satisfying the target value of the pattern occupancy ratio is calculated based on library information about an instance in a window and the area of an unoccupied region in the window, and generation of the dummy pattern is performed based on the calculation result.

In embodiment 3, the processes of steps S201 to S210 and calculation and registration of library information, or the like, are executed by a program on a computer which incorporates, for example, an arithmetic unit, such as a CPU, or the like, and a storage, such as a memory, or the like.

It should be noted that, in embodiment 3, the target occupancy ratio value in the occupancy ratio verification with each check window is set to a value equal to the center value of the area ratio range in the entire chip (see variation of embodiment 1) or a value close to the center value. With such a value, the target value of the area ratio in the entire chip can also be attained at the time when occupancy ratio verification is completed for all of the check windows.

Embodiment 4

Hereinafter, an area ratio/occupancy ratio verification method according to embodiment 4 of the present invention is described with reference to the drawings.

A feature of embodiment 4 resides in employing an area ratio/occupancy ratio verification method wherein an unoccupied region inside each instance is extracted, and a dummy pattern of embodiment 1 or its variation is virtually placed in a total unoccupied region consisting of the extracted unoccupied region and an unoccupied region outside the instance. As a matter of course, when library information of embodiment 2 or its variation is used to perform calculation of the area ratio/occupancy ratio as in embodiment 3, a verification process can be performed more quickly. Hereinafter, the area ratio/occupancy ratio verification method of embodiment 4 is specifically described.

As in embodiment 3, when a dummy pattern is virtually placed only in an unoccupied region outside each instance, the target value of the area ratio/occupancy ratio is not attained in some cases. For example, in the previously-described example shown in FIG. 14, if the target value of the occupancy ratio of metal wiring layer M1 in the check window 141 is 60% or higher, and only the shape and pitch equivalent to those of the dummy pattern 143 are accepted, the pattern occupancy ratio of metal wiring layer M1 is 48.75%, which does not attain the target value.

In the case where the check window overlaps with at least a portion of a huge instance, such as an analog region, or the like, there is a possibility that an unoccupied region exists inside an instance in the check window. In such a case, if the unoccupied region in the instance is used as a dummy pattern generation region as well as the unoccupied region outside the instance and it is verified whether or not the area ratio/occupancy ratio attains the target value, the necessity of making unnecessary layout corrections can be removed.

Figure 18:
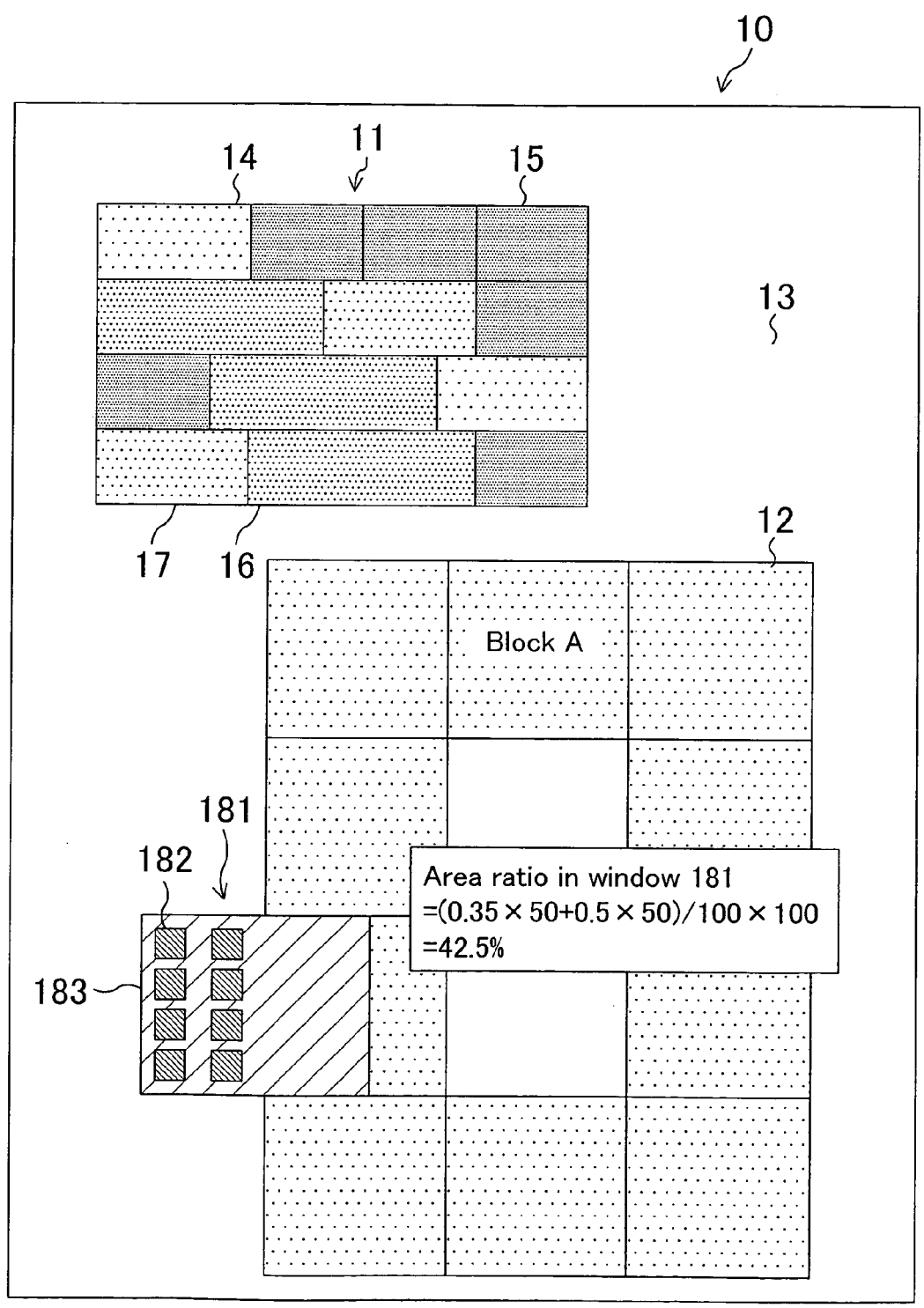
FIG. 18 illustrates problems in the area ratio/occupancy ratio verification method according to embodiment 3 of the present invention.

Now, consider an example shown in FIG. 18 where a check window 181 overlaps small block A2 of the block region 12 (block A) with an overlapped area of 50 $\mu m^2$. If a dummy pattern 182 is virtually placed only in an unoccupied region 183 outside the instance (block region 12) (example described in embodiment 3), the pattern occupancy ratio of metal wiring layer M1 in the check window 181 is calculated as described below. It should be noted that the layout shown in FIG. 18 is equivalent to the layout of FIG. 9. In the calculation shown below, the library information 81 of embodiment 2 shown in FIG. 8 and the detailed area ratio library information of block A shown in FIG. 15 are used. The check window 181 is a square window, each side of which is 10 $\mu m$ (area: 100 $\mu m^2$). The target value of the occupancy ratio of metal wiring layer M1 in the check window 181 is 45% or higher. The dummy pattern 182 has a rectangular shape and is virtually placed in the unoccupied region 183 such that 50% of the unoccupied region 183 is occupied by the dummy pattern 182.

The pattern occupancy ratio of metal wiring layer M1 is calculated as follows using the area ratio of small block A2 extracted from the detailed area ratio library information of block A (35% in metal wiring layer M1), or the like:

$$\text{(Pattern occupancy ratio of } M1) = (0.35 \times 50 + 0.50 \times$$
$$(100 - 50))/100 \times 100$$
$$= 42.5\%$$

Thus, it is seen that in the check window 181, the pattern occupancy ratio of metal wiring layer M1 has not achieve the target value (45% or higher). That is, the result of "occupancy ratio error" is obtained.

Figure 19:
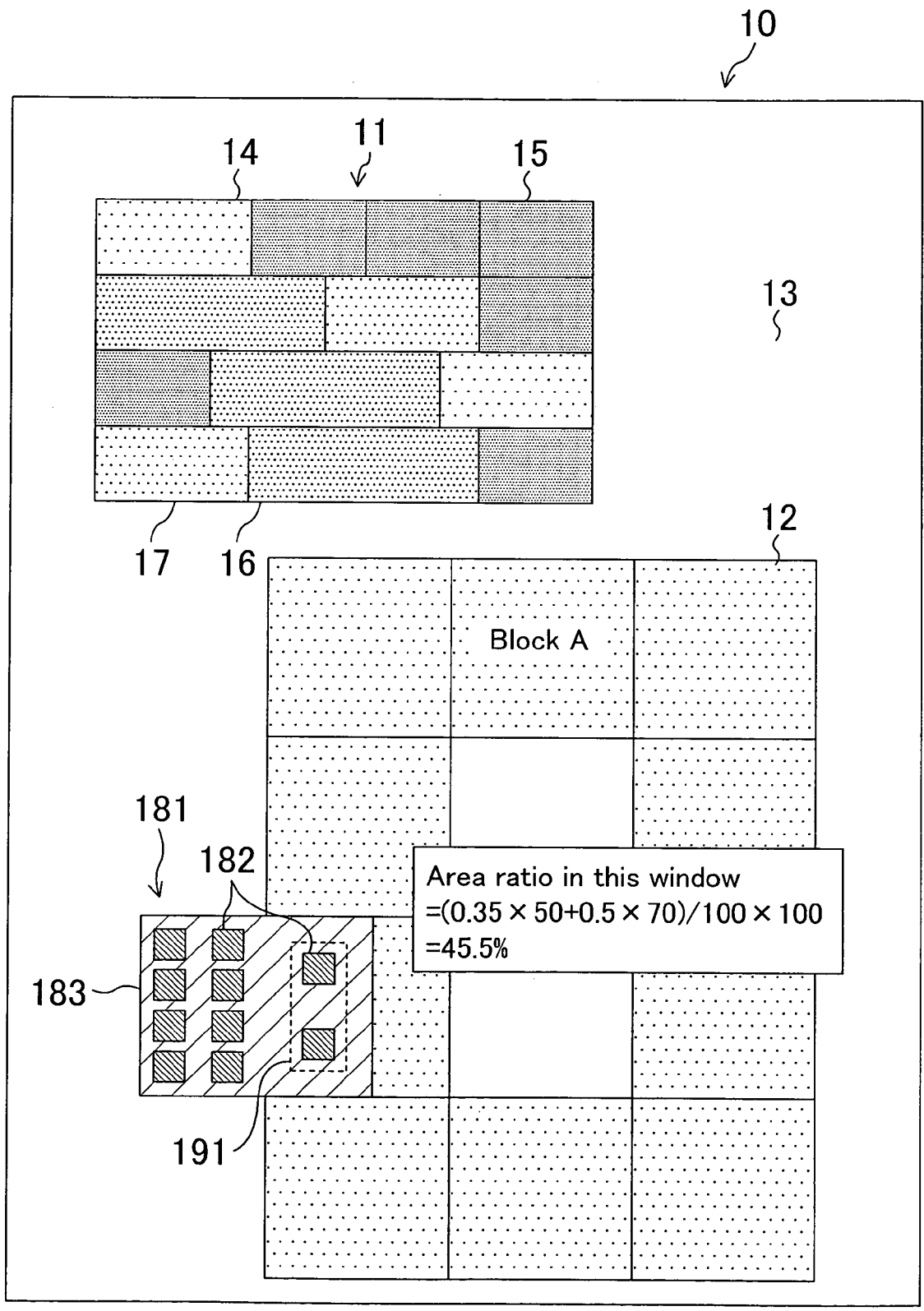
FIG. 19 illustrates an area ratio/occupancy ratio verification method according to embodiment 4 of the present invention.

However, as shown in FIG. 19, if an unoccupied region 191 of 20 $\mu m^2$ exists in small block A2 of the block region 12 (block A) and the rectangular dummy pattern 182 is virtually placed such that 50% of the total unoccupied region (total area: 70 $\mu m^2$) consisting of the unoccupied region 191 and the unoccupied region 183 outside the block region 12 is occupied by the dummy pattern 182, the pattern occupancy ratio of metal wiring layer M1 is calculated as follows:

$$\text{(Pattern occupancy ratio of } M1) = (0.35 \times 50 + 0.50 \times 70)/100 \times 100$$
$$= 45.5\%$$

It is seen from the above that the target value has been attained.

Hereinafter, the area ratio/occupancy ratio verification method of embodiment 4 is described in detail with reference to the flowchart of FIG. 20.

Figure 20:
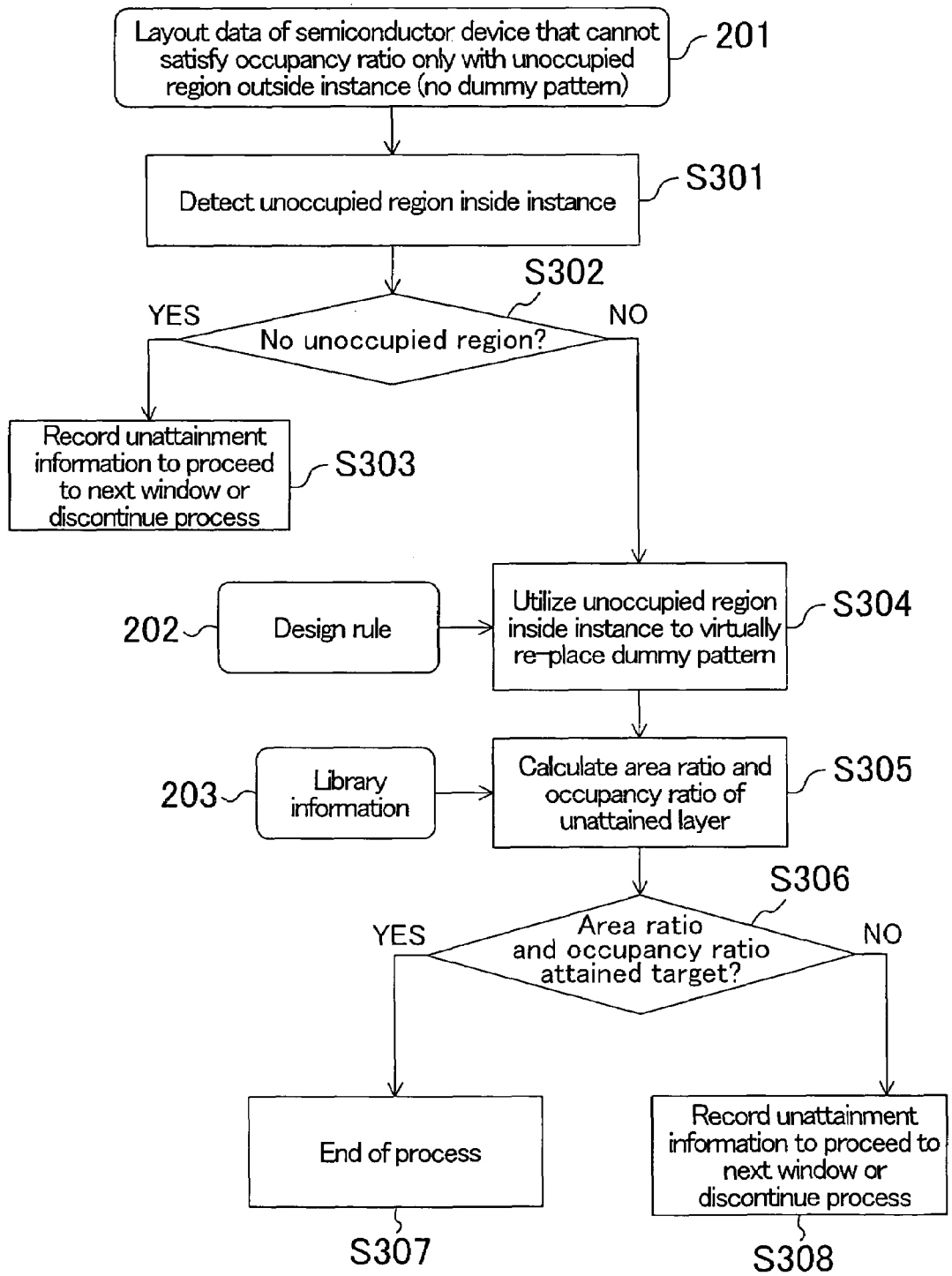
FIG. 20 is a flowchart of the area ratio/occupancy ratio verification method according to embodiment 4 of the present invention.

In embodiment 4, the processes of the area ratio/occupancy ratio verification method of embodiment 3 shown in the flowchart of FIG. 12 (the processes of virtually placing a dummy pattern in an unoccupied region outside an instance to calculate the occupancy ratio, or the like, and determining whether or not the calculated occupancy ratio has attained the target value according to steps S201 to S210) are executed before the processes of FIG. 20.

If layout data 201 which has not attained the target value of the area ratio/occupancy ratio is found through the processes of the method of embodiment 3, an unoccupied region is first extracted from each instance (step S301), and it is determined whether or not the extracted unoccupied region has an area sufficient for virtually placing a dummy pattern (step S302). If the extracted unoccupied region does not have an area sufficient for virtually placing a dummy pattern, or if no unoccupied region is extracted, it is determined that "there is no unoccupied region".

If it is determined at step S302 that "there is no unoccupied region" inside the instance, it is impossible to continue adjustment of the area ratio/occupancy ratio using a dummy pattern. Thus, unattainment information (information indicating a position (check window) at which the pattern occupancy ratio has not attained the target value) is recorded or output to proceed to a process with the next check window, or the area ratio/occupancy ratio verification process is discontinued (step S303).

If it is not determined at step S302 that "there is no unoccupied region" inside the instance, in other words, if it is determined that "there is an unoccupied region" inside the instance, the dummy pattern is again placed in a region consisting of an unoccupied region outside the instance and the unoccupied region inside the instance which has been extracted at step S301 based on a design rule 202 (step S304).

Then, the pattern occupancy ratio in an unattained layer in a check window is calculated using the library information 203 of embodiment 2 or its variation (step S305). Thereafter, it is verified whether or not the target value of the pattern occupancy ratio has been attained in the check window by re-placement of the dummy pattern (step S306). In the calculation of the pattern occupancy ratio at step S305, calculation of the pattern occupancy ratio is achieved quickly with high accuracy by using the library information 203.

If it is determined as a result of the verification at step S306 that the target value of the pattern occupancy ratio has been attained, the process with the check window is terminated (step S307).

If it is determined as a result of the verification at step S306 that the target value of the pattern occupancy ratio has not been attained (target occupancy ratio unattained), unattainment information is recorded or output to proceed to a process with the next check window, or the area ratio/occupancy ratio verification process is discontinued (step S308).

According to embodiment 4, as described above, it is possible to perform area ratio/occupancy ratio verification while efficiently using an unoccupied region inside an instance.

In embodiment 4, the processes of steps S301 to S308 are executed by a program on a computer which incorporates, for example, an arithmetic unit, such as a CPU, or the like, and a storage, such as a memory, or the like.

As for an unoccupied region inside an instance in embodiment 4, if the instance is of such a type that a dummy pattern placed therein in advance may be removed, the dummy pattern inside the instance may be removed before extraction of the unoccupied region at step S301, and thereafter, the processes at and after step S301 may be performed.

In embodiment 4, a dummy pattern placed in an unoccupied region outside an instance and a dummy pattern placed inside the instance may be different in shape, pitch, or the like.

Embodiment 5

Hereinafter, a pattern generation method according to embodiment 5 of the present invention, specifically, a pattern generation method which uses any of the area ratio/occupancy ratio verification methods of embodiments 1-4 (including their variations) is described with reference to the drawings.

In embodiment 5, a dummy pattern which attains the target value of the area ratio/occupancy ratio is actually placed in an unoccupied region in a check window based on a result of the area ratio/occupancy ratio verification method of any of embodiments 1-4. Herein, dummy patterns having different shapes may be used in one layer of a chip.

Figure 21:
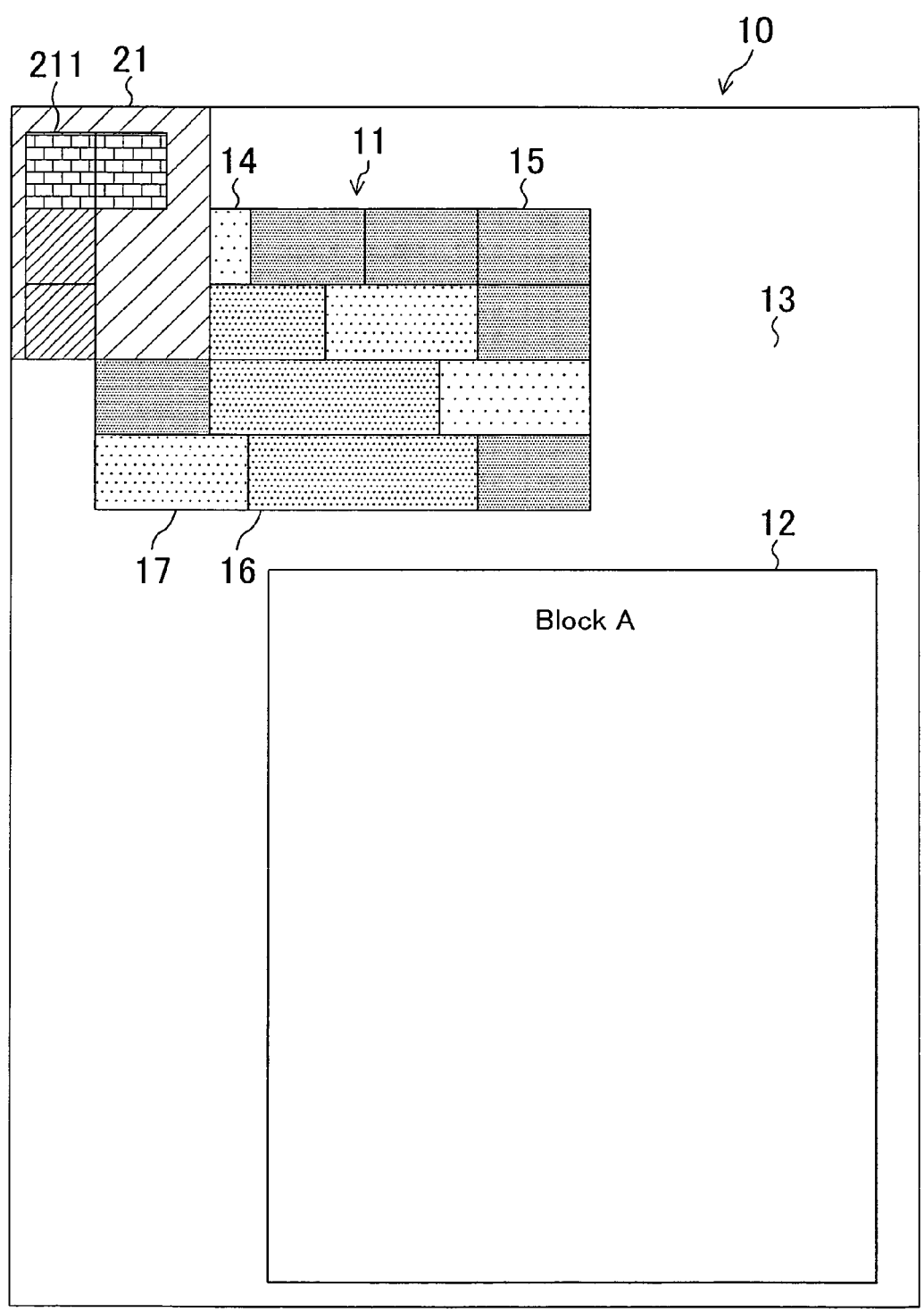
FIG. 21 illustrates an area ratio/occupancy ratio verification method according to embodiment 5 of the present invention.

In embodiment 5, if it is found as a result of area ratio/occupancy ratio verification that, for example, it is necessary to place the dummy pattern 31 in an unoccupied region in the check window 21 as shown in FIG. 3 (see Embodiment 1), a standard cell 211 which has no relation to the circuit operation of the chip 10 when actually used may be placed instead of the dummy pattern 31 as shown in FIG. 21 such that the target value of the area ratio/occupancy ratio is attained. The standard cell 211 may be a cell which has a relation to the circuit operation of the chip 10 when actually used, such as a substrate contact cell, a flip-flop, an AND circuit, or the like. In this case, the standard cell 211 can be used as a bonus cell in a layout correction process. Alternatively, another standard cell or a cell having the same shape as that of the standard cell 211 may be placed instead of the standard cell 211.

According to embodiment 5, any of the area ratio/occupancy ratio verification methods of embodiments 1-4 is used. Thus, a layout of a semiconductor device, or the like, which attains the target value of the area ratio/occupancy ratio can be automatically obtained.

It should be noted that the embodiments of the present invention disclosed in the above descriptions are merely examples in any aspect, and the present invention is not limited to the examples of these embodiments. For example, the features of the above embodiments may be combined as necessary. The scope of the present invention is defined only by the recitations of the claims and encompasses all possible variations including equivalent embodiments and examples.

What is claimed is:

1. A program stored in a computer-readable medium which generates a pattern of a semiconductor integrated circuit device, the program causing a computer to execute:
    a first step of calculating a pattern area ratio of a semiconductor integrated circuit device or a pattern occupancy ratio in a cheek window set for the semiconductor integrated circuit device on an assumption that a dummy pattern defined by a process condition is virtually placed in an unoccupied region of the semiconductor integrated circuit device or in an unoccupied region of each instance provided in the semiconductor integrated circuit device without actually placing the dummy pattern;
    a second step of verifying whether or not the pattern area ratio or the pattern occupancy ratio has attained a predetermined target value,
    wherein if the pattern area ratio or the pattern occupancy ratio has not attained the predetermined target value, a generation specification for the dummy pattern is changed within a range that complies with a process rule;
    a third step of calculating the pattern area ratio or the pattern occupancy ratio on an assumption that a dummy pattern generated with changed generation specification in the second step is virtually placed in the unoccupied region of the semiconductor integrated circuit device or in the unoccupied region of the each instance without actually placing the dummy pattern; and
    a fourth step of verifying whether or not the pattern area ratio or the pattern occupancy ratio has attained the predetermined target value; and
    a fifth step of actually placing a dummy pattern which attains the predetermined target value in the unoccupied region of the semiconductor integrated circuit device or in the unoccupied region of the each instance based on the result of the second step or the fourth step.

2. A computer-implemented pattern generation method of a semiconductor integrated circuit device, the method comprising:

a first step of calculating a pattern area ratio of a semiconductor integrated circuit device or a pattern occupancy ratio in a check window set for the semiconductor integrated circuit device on an assumption that a dummy pattern defined by a process condition is virtually placed in an unoccupied region of the semiconductor integrated circuit device or in an unoccupied region of each instance provided in the semiconductor integrated circuit device without actually placing the dummy pattern;

a second step of verifying whether or not the pattern area ratio or the pattern occupancy ratio has attained a predetermined target value, wherein if the pattern area ratio or the pattern occupancy ratio has not attained the predetermined target value, a generation specification for the dummy pattern is changed within a range that complies with a process rule;

a third step of calculating the pattern area ratio or the pattern occupancy ratio on an assumption that a dummy pattern generated with changed generation specification in the second step is virtually placed in the unoccupied region of the semiconductor integrated circuit device or in the unoccupied region of the each instance without actually placing the dummy pattern; and a fourth step of verifying whether or not the pattern area ratio or the pattern occupancy ratio has attained the predetermined target value; and a fifth step of actually placing a dummy pattern which attains the predetermined target value in the unoccupied region of the semiconductor integrated circuit device or in the unoccupied region of the each instance based on the result of the second step or the fourth step.

3. The computer-implemented pattern generation method of claim 2, wherein if a result of the pattern occupancy ratio verification shows that the pattern occupancy ratio has not attained the predetermined target value by virtual placement of the dummy pattern even with any change to the generation specification, one of the step of outputting the check window corresponding to the pattern occupancy ratio as an unattained position to verify the pattern occupancy ratio for a new check window and the step of discontinuing the verification process is selected.

4. The computer-implemented pattern generation method of claim 2, wherein:

the area ratio of the each instance in each layer of the semiconductor integrated circuit device is obtained as library information before verification of the pattern area ratio or pattern occupancy ratio; and the library information is used in the verification of the pattern area ratio or pattern occupancy ratio.

5. The computer-implemented pattern generation method of claim 4, wherein the library information is obtained on an assumption that the area ratio of the each instance in the each layer has a uniform value entirely inside the instance.

6. The computer-implemented pattern generation method of claim 4, wherein the area ratio of each of a plurality of divisional regions of the each instance in the each layer is obtained as the library information.

7. The computer-implemented pattern generation method of claim 4, wherein the area ratio of a perimeter region which has a width equal to that of the check window in at least one of the instances in the each layer is obtained as the library information.

8. The computer-implemented pattern generation method of claim 7, wherein the area ratio of each of a plurality of divisional regions of the perimeter region in the each layer is obtained as the library information.

9. The computer-implemented pattern generation method of claim 4, wherein verification of the pattern area ratio or pattern occupancy ratio is performed using the library information on an assumption that the dummy pattern is placed only in an unoccupied region outside the each instance in the semiconductor integrated circuit device.

10. The computer-implemented pattern generation method of claim 9, wherein if a result of the pattern area ratio verification or pattern occupancy ratio verification performed on the assumption that the dummy pattern is placed only in an unoccupied region outside the each instance shows that the pattern area ratio or pattern occupancy ratio has not attained a predetermined target value, an unoccupied region inside the each instance is extracted, and it is determined whether or not the extracted unoccupied region has an area sufficient for virtually placing the dummy pattern.

11. The computer-implemented pattern generation method of claim 10, wherein if it is determined that the extracted unoccupied region has an area sufficient for virtually placing the dummy pattern, verification of the pattern area ratio or pattern occupancy ratio is performed on an assumption that the dummy pattern is placed also in the extracted unoccupied region as well as the unoccupied region outside the each instance.

12. The computer-implemented pattern generation method of claim 2, wherein a plurality of said dummy patterns having different shapes are provided in one layer of the semiconductor integrated circuit device.

13. The computer-implemented pattern generation method of claim 2, wherein a standard cell which has no relation to a circuit operation of the semiconductor integrated circuit device when actually used is placed instead of the dummy pattern.

* * * * *